(12) United States Patent
Gilbert et al.

(10) Patent No.: US 12,343,942 B2
(45) Date of Patent: Jul. 1, 2025

(54) PROCESS FOR JOINING OVERLAPPING THERMOPLASTIC MEMBRANE COMPONENTS

(71) Applicant: Holcim Technology Ltd, Zug (CH)

(72) Inventors: Mitchell L. Gilbert, Hemlock, MI (US); Crint A. LaBrosse, Bay City, MI (US)

(73) Assignee: HOLCIM TECHNOLOGY LTD, Zug (CH)

( * ) Notice: Subject to any disclaimer, the term of this patent is extended or adjusted under 35 U.S.C. 154(b) by 0 days.

(21) Appl. No.: 18/377,405

(22) Filed: Oct. 6, 2023

(65) Prior Publication Data

US 2024/0262044 A1     Aug. 8, 2024

Related U.S. Application Data

(63) Continuation of application No. 17/716,031, filed on Apr. 8, 2022, now Pat. No. 11,813,803, which is a
(Continued)

(51) Int. Cl.
*B29C 65/32* (2006.01)
*B29C 65/00* (2006.01)
*B29C 65/02* (2006.01)

(52) U.S. Cl.
CPC ............ *B29C 65/32* (2013.01); *B29C 65/022* (2013.01); *B29C 66/112* (2013.01); *B29C 66/7392* (2013.01)

(58) Field of Classification Search
CPC ..... B29C 65/32; B29C 65/022; B29C 66/004; B29C 66/112; B29C 66/7392;
(Continued)

(56) References Cited

U.S. PATENT DOCUMENTS

| | | |
|---|---|---|
| 3,462,336 A | 8/1969 | Leatherman |
| 4,652,321 A | 3/1987 | Greko |

(Continued)

FOREIGN PATENT DOCUMENTS

| | | | | |
|---|---|---|---|---|
| JP | 07156272 A | * | 6/1995 | ............ B29C 65/04 |
| WO | WO2011070598 A1 | | 6/2011 | |

OTHER PUBLICATIONS

International Preliminary Report on Patentability issued for PCT/US2020/013221 on Jul. 22, 2021.
(Continued)

*Primary Examiner* — John L Goff, II
(74) *Attorney, Agent, or Firm* — Reising Ethington PC

(57) ABSTRACT

A method of joining overlapping thermoplastic membrane components in which a first thermoplastic membrane component and a second thermoplastic membrane component are positioned in overlapping relationship between a pair of complementary molding surfaces, with at least one of the complementary molding surfaces being defined by an electrically conductive metal susceptor. Heat is generated in the metal susceptor and transferred by thermal conduction from the metal susceptor to overlapping portions of the first and second thermoplastic membrane components to locally melt and coalesce at least a portion of the thermoplastic material of the first thermoplastic membrane component and at least a portion of the thermoplastic material of the second thermoplastic membrane component. The molten thermoplastic material of the first and second thermoplastic membrane components forms a zone of coalesced thermoplastic material that, upon cooling, forms a solid weld joint that fusion welds the first and second thermoplastic membrane components together.

6 Claims, 14 Drawing Sheets

Related U.S. Application Data continuation of application No. 16/740,326, filed on Jan. 10, 2020, now Pat. No. 11,331,863.

(60) Provisional application No. 62/791,290, filed on Jan. 11, 2019.

(58) Field of Classification Search
CPC ... B29C 66/24221; B29C 66/63; B29C 66/49; B23K 13/01; B23K 3/0475
USPC ......................................................... 156/293
See application file for complete search history.

(56) References Cited

U.S. PATENT DOCUMENTS

| | | | |
|---|---|---|---|
| 4,799,986 | A | 1/1989 | Janni |
| 4,872,296 | A | 10/1989 | Janni |
| 5,829,214 | A | 11/1998 | Hart |
| 5,935,475 | A | 8/1999 | Scoles et al. |
| 6,323,468 | B1 | 11/2001 | Dabelstein et al. |
| 2006/0046084 | A1 | 3/2006 | Yang et al. |
| 2009/0320383 | A1 | 12/2009 | Taylor et al. |
| 2010/0051587 | A1 | 3/2010 | Iwamizu |

OTHER PUBLICATIONS

Office action issued by the Canadian Patent Office for application CA 3,125,754 on Oct. 21, 2022.

* cited by examiner

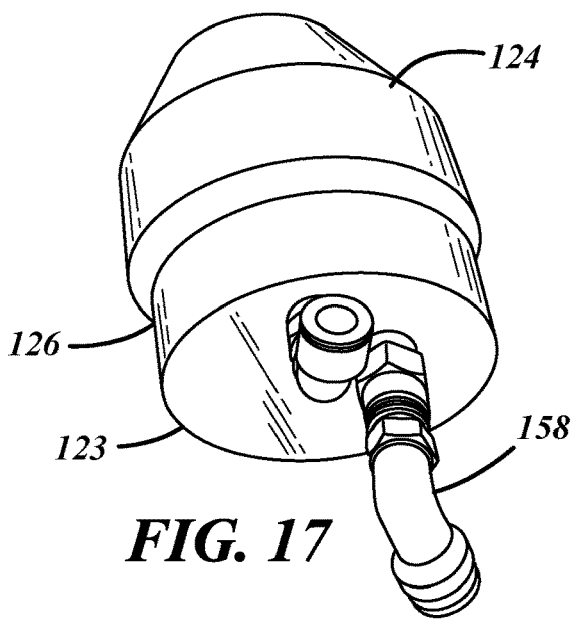
FIG. 17
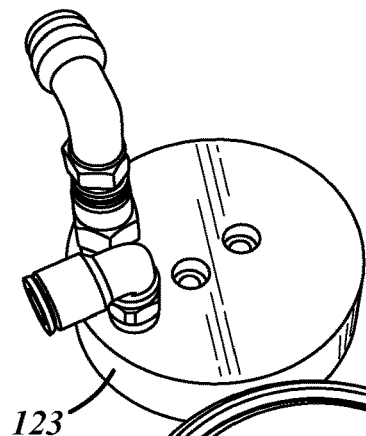
FIG. 18
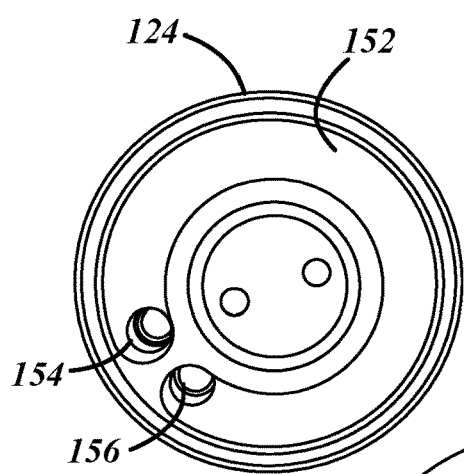
FIG. 19
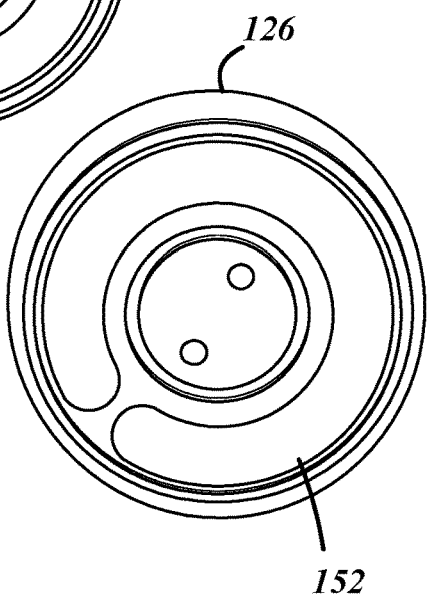

PROCESS FOR JOINING OVERLAPPING THERMOPLASTIC MEMBRANE COMPONENTS

CROSS-REFERENCE TO RELATED APPLICATION

This patent application is a continuation of, and hence claims the benefit of, U.S. patent application Ser. No. 17/716,031, now U.S. Pat. No. 11,813,803, with a filing date of Apr. 8, 2022, entitled "Process for Joining Overlapping Thermoplastic Membrane Components," which is herein incorporated by reference in its entirety.

INTRODUCTION

Flat and low-slope roofs for industrial and commercial buildings are commonly covered with flexible single-ply thermoplastic roofing membranes to provide the roofs with improved weather resistance. Such roofing membranes may comprise a woven fiber core encased in a thermoplastic sheath. Pipes, vents, stacks, drains, and other objects commonly protrude or are recessed away from the surface of such roofs and accommodations must be made to allow such objects to pass through the roofing membranes without compromising the integrity of the roof membranes. For example, to accommodate cylindrical projections protruding from the surface of such roofs, flashing structures, including a base and a sleeve extending from a central opening in the base, may be installed over and around the cylindrical projections in the field and heat welded in place to an underlying, lapped portion of the roofing membrane to form a water-tight seal therebetween. In addition, to accommodate relatively large rectangular objects projecting from such roofs, corner pieces and corner spanning sections may be installed around the rectangular objects in the field and heat welded in place to an underlying, lapped portion of the roofing membrane to form a water-tight seal therebetween. Such flashing structures, corner pieces, and corner spanning sections may be assembled in the field or prefabricated in a factory prior to installation. Prefabricated flashing structures, corner pieces, and other sealed enclosures for fiber-reinforced thermoplastic roofing membranes of this type are described in U.S. Pat. Nos. 4,652,321; 4,799,986; 4,872,296; and 5,829,214, the contents of which are incorporated herein by reference.

Flashing structures, corner pieces, and other sealed enclosures for thermoplastic roofing membranes may be made of the same single-ply thermoplastic material as that of the roofing membrane and prefabricated in the factory into a form that is at least partially complementary to the shape of the projection or depression in the roof. During the prefabrication process, two or more pieces of roofing membrane material are typically positioned in overlapping relationship and joined together by heating and pressing the overlapping portions together such that the overlapping portions fuse together, a process sometimes referred to as heat sealing. Prior methods of joining together overlapping portions of thermoplastic roofing membrane components include hot gas welding and radio frequency (RF) welding, also referred to as high frequency welding or dielectric welding or sealing. Hot gas welding is a manual welding process for joining thermoplastic materials in which a stream of hot gas, usually air, is directed at confronting surfaces of the overlapping portions to be joined so that the overlapping portions are externally heated to a viscous state in which the interdiffusion of polymer chain molecules can occur when the overlapping portions are pressed together. In RF welding, the overlapping portions to be joined are heated to a viscous state by applying high frequency electromagnetic energy to the overlapping portions such that heat is internally generated within the thermoplastic material itself.

To effectively join thermoplastic materials together using an RF welding process, the thermoplastic materials must contain polar molecules or polar groups in their molecular structure. This is because, when a polar thermoplastic material is exposed to an alternating electric field, the polar molecules in the material will continuously attempt to align themselves with the alternating electric field, leading to random molecular motion, intermolecular friction, and internal heat generation within the polar thermoplastic material itself. Examples of polar thermoplastic materials that can be welded to one another via RF welding processes include vinyl, such as polyvinyl chloride (PVC), polyester (PE), polyurethane (PU), polyamide (PA), such as nylon, polylactic acid (PLA), and acetate. However, because RF welding processes rely upon the action of polar molecules in an applied electric field, such processes cannot be used to effectively weld non-polar thermoplastics, such as polyolefins. Examples of non-polar polyolefins that cannot be effectively joined together using conventional RF welding processes include polyethylene (PE), polypropylene (PP), polystyrene (PS), polytetrafluoroethylene (PTFE), polybutene, polyisoprene, polypentene, and copolymers thereof.

Thermoplastic polyolefins (TPO), produced by the copolymerization of polypropylene and ethylene-propylene monomer (EPM) rubber or ethylene-propylene-diene monomer (EPDM) rubber, are desirable materials for use in thermoplastic roofing membranes and geomembrane applications due to their UV reflectivity, aesthetics, and relatively low cost, as compared to PVC. However, current TPO roofing membrane formulations are made of nonpolar thermoplastic materials and thus cannot be joined together using existing RF welding processes. In addition, current TPO roofing membrane formulations are relatively stiff, making manual welding processes more difficult, especially in cold weather.

SUMMARY

In a method of joining overlapping thermoplastic membrane components, a first membrane component, a second membrane component, and a pair of first and second forms having complementary molding surfaces may be provided. The first membrane component may have a first edge portion comprising a thermoplastic material, and the second membrane component may have a second edge portion comprising a thermoplastic material. The complementary molding surface of at least one of the first form or the second form may be defined by an electrically conductive metal susceptor. The first and second edge portions may be positioned in overlapping relationship between the first and second forms adjacent the metal susceptor such that opposed surfaces of the first and second edge portions contact each other to establish a faying interface therebetween at a weld site. The metal susceptor may be heated such that heat is transferred by thermal conduction from the metal susceptor to the first and second edge portions of the first and second components to locally melt and coalesce at least a portion of the thermoplastic material of the first edge portion and at least a portion of the thermoplastic material of the second edge portion and form a zone of coalesced thermoplastic material along the faying interface at the weld site. The metal susceptor may be heated by induction. Then, the zone of coalesced thermoplastic material may be cooled to form a solid weld joint of resolidified thermoplastic material that fusion welds the first and second edge portions of the first and second components together at the weld site.

An electrically conductive coil may be positioned around the first and second edge portions of the first and second components adjacent the metal susceptor and an alternating current may be passed through the coil to generate an alternating magnetic field that acts on the metal susceptor and induces heating within the metal susceptor. The alternating current passing through the coil may have a frequency in the range of 10 Hz to 10 MHz. The alternating magnetic field may not induce heating within the thermoplastic material of the first edge portion or the thermoplastic material of the second edge portion.

In some embodiments, the complementary molding surface of the first form may be defined by the metal susceptor. In such case, the first and second edge portions may be positioned in overlapping relationship between the first and second forms such that the complementary surface of the second form presses the first and second edge portions against the complementary surface of the first form and against one another at the weld site. The complementary surface of the second form may exert a force on the first and second edge portions of the first and second components in a direction perpendicular to the faying interface established between the opposed surfaces of the first and second edge portions.

The first and second edge portions may be positioned in overlapping relationship between the first and second forms such that either the first edge portion or the second edge portion is in direct contact with the metal susceptor.

In some embodiments, the zone of coalesced thermoplastic material may be actively cooled by positioning a cooling medium adjacent the first edge portion or the second edge portion. Additionally or alternatively, the zone of coalesced thermoplastic material may be actively cooled by flowing a cooling fluid through an internal cooling passage defined in the first or the second form.

In some embodiments, the zone of coalesced thermoplastic material may be formed by heating at least a portion of the thermoplastic material of the first edge portion and at least a portion of the thermoplastic material of the second edge portion to a temperature greater than 200 degrees Celsius.

The thermoplastic material of the first or second edge portion may comprise polyethylene, polypropylene, polystyrene, polyester, polycarbonate, polyurethane, polyamide, polylactic acid, acetate, vinyl, poly(methyl methacrylate), nitrile, or a block copolymer thermoplastic elastomer. In some embodiments, the thermoplastic material of the first or second edge portion may comprise a thermoplastic polyolefin (TPO).

The solid weld joint may form a water-tight seal between the first and second edge portions at the weld site.

In some embodiments, the first and second components may be fusion welded together at the weld site to form a unitary thermoplastic structure for a thermoplastic roofing membrane or a geomembrane.

In some embodiments, the first membrane component may comprise a sleeve and the first edge portion may be defined by an annular base portion of the sleeve. At the same time, the second membrane component may comprise a skirt and the second edge portion may be defined by an annular waist portion of the skirt surrounding a circular central opening in the skirt. In such case, the first form may comprise a frustoconical male form including a body and the second form may comprise a cylindrical female form, with the metal susceptor comprising an annular susceptor that extends circumferentially around the body of the male form. The sleeve and the skirt may be positioned adjacent one another around the male form such that the base portion of the sleeve and the waist portion of the skirt overlap one another at the weld site adjacent the annular susceptor. The female form may be positioned around the male form such that the female form presses the base portion of the sleeve and the waist portion of the skirt against one another and against an outer circumferential surface of the annular susceptor at the weld site. The zone of coalesced thermoplastic material may be actively cooled by passing a cooling liquid through an internal cooling passage defined in the male form. The zone of coalesced thermoplastic material may be actively cooled by positioning a solid cooling member around the male form adjacent the base portion of the sleeve and the waist portion of the skirt. The sleeve and the skirt may be fusion welded together at the weld site to form a unitary pipe flashing structure for a thermoplastic roofing membrane.

In some embodiments, the first membrane component may comprise a first rectangular component and the first edge portion may be defined by an outer edge portion of the first rectangular component. At the same time, the second membrane component may comprise a second rectangular component and the second edge portion may be defined by an inner edge portion of the second rectangular component defined by a slit in the second rectangular component. In such case, the first form may include a pair of vertical sidewalls joined together by a vertically extending curvilinear section that together define a generally flat V-shaped welding surface, and the second form may comprise a metal substrate that defines a generally flat complementary welding surface. The metal substrate, the outer and inner edge portions of the first and second rectangular components may be positioned in overlapping relationship between the generally flat V-shaped welding surface of the first form and the generally flat complementary welding surface of the second form. The first rectangular component and the second rectangular component may be fusion welded together at the weld site to form a unitary corner piece for a thermoplastic roofing membrane.

In a method of joining overlapping thermoplastic membrane components, first, second, and third membrane components and a pair of first and second forms having complementary molding surfaces may be provided. The first membrane component may have a first edge portion comprising a thermoplastic material, the second membrane component may have a second edge portion comprising a thermoplastic material, and the third component may comprise a thermoplastic material and may have a first surface and an opposite second surface. The complementary molding surfaces of at least one of the first form or the second form may be defined by an electrically conductive metal susceptor. The first and second edge portions of the first and second membrane components and the third component may be positioned in overlapping relationship between the first and second forms adjacent the metal susceptor such that the third component is situated between the first and second membrane components, with the first surface of the third component facing toward and contacting a faying surface of the first edge portion of the first membrane component to establish a first faying interface therebetween at a weld site and the second surface of the third component facing toward and contacting a faying surface of the second edge portion of the second membrane component to establish a second faying interface therebetween at the weld site. The metal susceptor may be heated such that heat is transferred by thermal conduction from the metal susceptor to the first and second edge portions of the first and second components and to the third component to locally melt at least a portion of the thermoplastic material of the third component and form a zone of molten thermoplastic material between and along the first and second faying interfaces at the weld site. Then, the zone of molten thermoplastic material may be cooled to form a solid weld joint of resolidified thermoplastic material that bonds the first and second edge portions of the first and second components together at the weld site.

An apparatus for joining overlapping thermoplastic membrane components using an indirect induction welding technique may comprise a pair of first and second forms having complementary molding surfaces. The complementary molding surface of at least one of the first form or the second form may be defined by an electrically conductive metal susceptor. The apparatus also may comprise an electrically conductive coil positioned adjacent the metal susceptor. In some embodiments, the first form may comprise a frustoconical male form including a body and the second form may comprise a cylindrical female form. In such case, the metal susceptor may comprise an annular susceptor that extends circumferentially around the body of the male form. The frustoconical male form may define an internal cooling passage. In other embodiments, the first form may include a pair of vertical sidewalls joined together by a vertically extending curvilinear section that together define a generally flat V-shaped welding surface. In such case, the second form may comprise a metal substrate that defines a complementary welding surface.

BRIEF DESCRIPTION OF THE DRAWINGS

FIGS. 17, 18, and 19 are images of a male form including an internal cooling passage through which a liquid cooling medium may be circulated, in accordance with one or more embodiments of the present disclosure;

DETAILED DESCRIPTION

Figure 1:
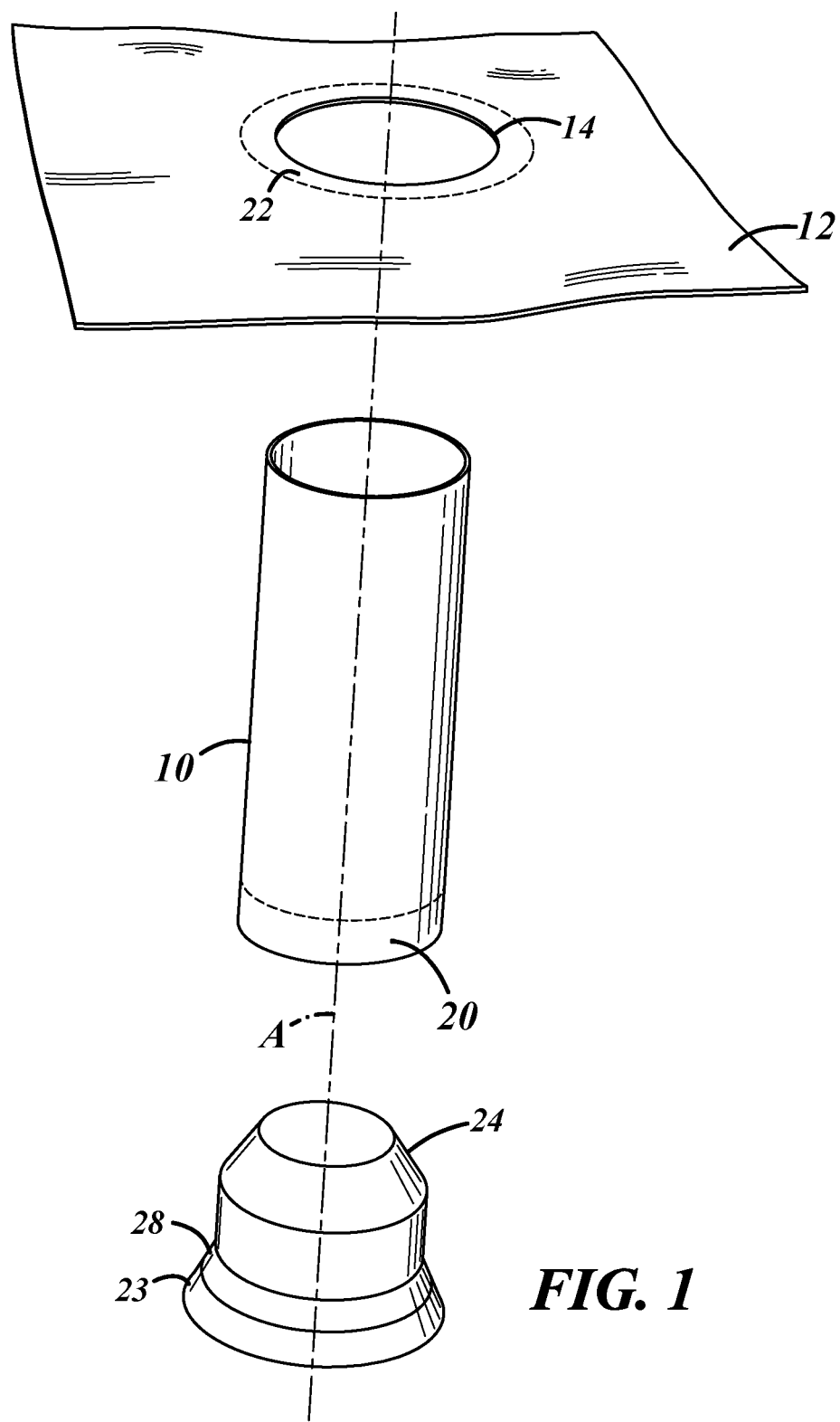
FIG. 1 is an image of multiple thermoplastic skirt and sleeve components that can be joined together to form pipe flashing structures for thermoplastic roofing membranes, in accordance with one or more embodiments of the present disclosure.

The welding process described herein can be used to effectively join overlapping portions of thermoplastic membrane components using an indirect induction welding technique. The overlapping portions of the thermoplastic membrane components are positioned adjacent an electrically conductive metal susceptor such that one of the thermoplastic membrane components is in direct or indirect physical contact with the metal susceptor. Then, heat is produced in the metal susceptor by generating an oscillating electromagnetic field in and around the metal susceptor, for example, by passing an alternating current through an electrically conductive coil positioned around the metal susceptor. The heat produced in the metal susceptor is transferred by thermal conduction to the adjacent overlapping portions of the thermoplastic membrane components such that the overlapping portions locally melt and fuse together at a weld site without use of an adhesive, electrically conductive implant, or other material addition. The overlapping portions are cooled and re-solidified in-place to form a solid weld joint therebetween that bonds the thermoplastic membrane components together at the weld site, thereby forming a unitary thermoplastic membrane structure.

Unitary thermoplastic membrane structures formed via the presently disclosed indirect induction welding process can be used in a variety of applications where an air and water impermeable barrier is desired. Examples of unitary thermoplastic membrane structures that can be formed via the presently disclosed indirect induction welding process include thermoplastic roofing membranes and membrane liners and covers, which are sometimes referred to as "geomembranes." Specific examples of unitary thermoplastic membrane structures for thermoplastic roofing membranes include: closed and split pipe flashing structures for round and square rooftop projections, inside and outside corner and curb flashing structures, conical flashing structures, vents and exhaust stacks, drain insert and outlet flashing structures, pocket flashings or pipe portal systems (for multiple rooftop projections), and scuppers. Specific examples of geomembrane products that may be provided in the form of a unitary thermoplastic membrane structure and manufactured via the presently disclosed indirect induction welding process include: liners and covers (or caps) for canals, ponds, landfills, wastewater treatment lagoons, potable water containment, hydraulic fracturing, and remediation sites.

Each of the thermoplastic membrane components joined together via the presently disclosed indirect induction welding process may comprise an electrically insulating thermoplastic material, which may or may not be reinforced with at least one ply of a woven or non-woven fabric. The electrically insulating thermoplastic material preferably does not include an electrically conductive implant, for example, the electrically insulating thermoplastic material preferably does not include an electrically conductive composite implant of conductive polyaniline (PA). The electrically insulating thermoplastic material of the thermoplastic membrane components may be nonpolar.

Thermoplastic materials are polymeric materials that soften when heated above their glass transition temperature and can be repeatedly heated and cooled above and below such temperature while still maintaining their chemical and mechanical properties. Examples of electrically insulating thermoplastic materials that may be joined together according to one or more embodiments of the presently disclosed indirect induction welding process include: polyethylene (PE), polypropylene (PP), polystyrene (PS), polyester (PE), polycarbonate (PC), polyurethane (PU), polyamide (PA), such as nylon, polylactic acid (PLA), acetate, vinyl, such as polyvinyl chloride (PVC), poly(methyl methacrylate) (PMMA), nitrile, such as acrylonitrile butadiene styrene (ABS), and block copolymer thermoplastic elastomers (TPE), which are produced from a combination of thermoplastic and elastomeric components. Examples of thermoplastic elastomers that may be joined together according to one or more embodiments of the presently disclosed indirect induction welding process include: thermoplastic polyolefins (TPO) produced by the copolymerization of polypropylene and ethylene-propylene monomer (EPM) rubber or ethylene-propylene-diene monomer (EPDM) rubber and styrene-ethylene-butylene-styrene (SEBS) compounds. Specific examples of thermoplastic polyethylene materials include: high density polyethylene (HDPE), low density polyethylene (LDPE), linear low density polyethylene (LLDPE), and chlorosulfonated polyethylene (CSPE).

Figure 2:
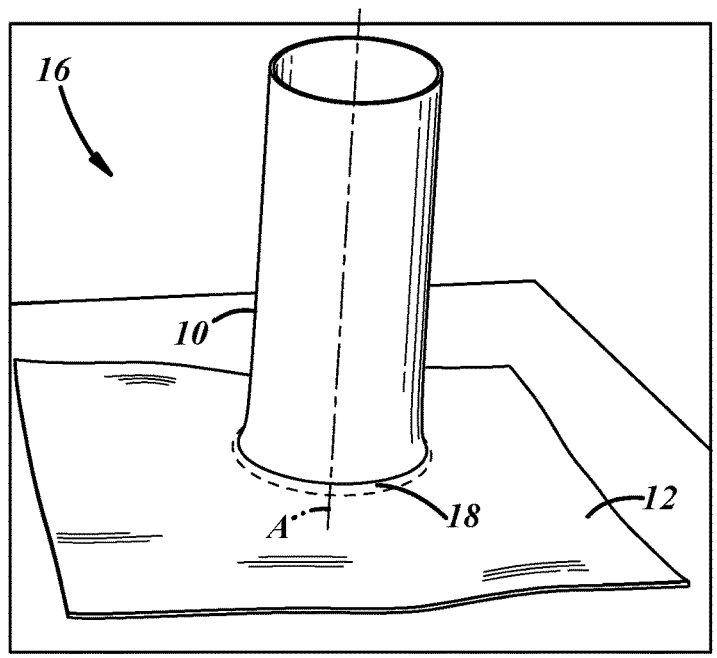
FIG. 2 is an image of a pipe flashing structure formed by joining together overlapping portions of one of the sleeve components and one of the skirt components of FIG. 1.
Figure 3:
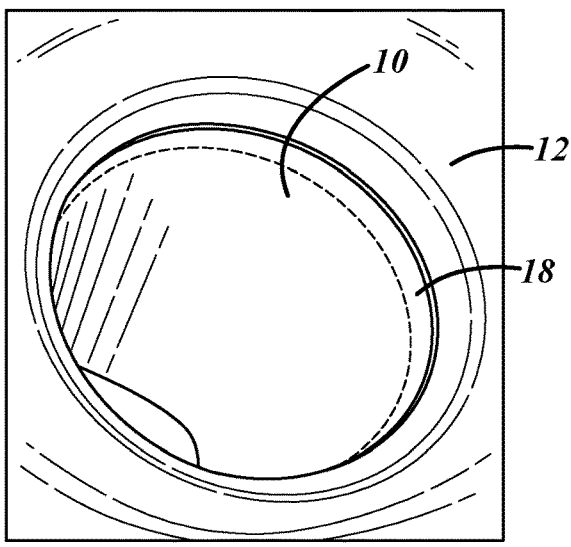
FIGS. 3 and 4 are images of a solid weld joint formed between overlapping portions of the sleeve and skirt components of FIG. 2.
Figure 4:
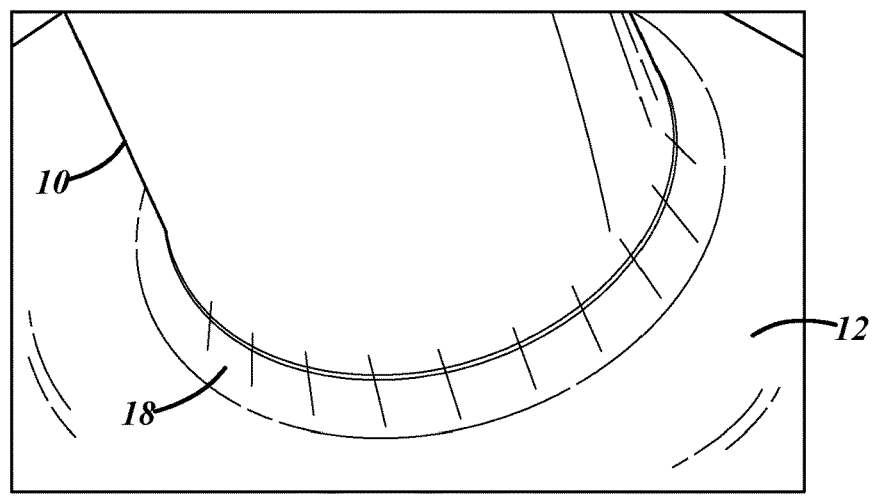
Figure 5:
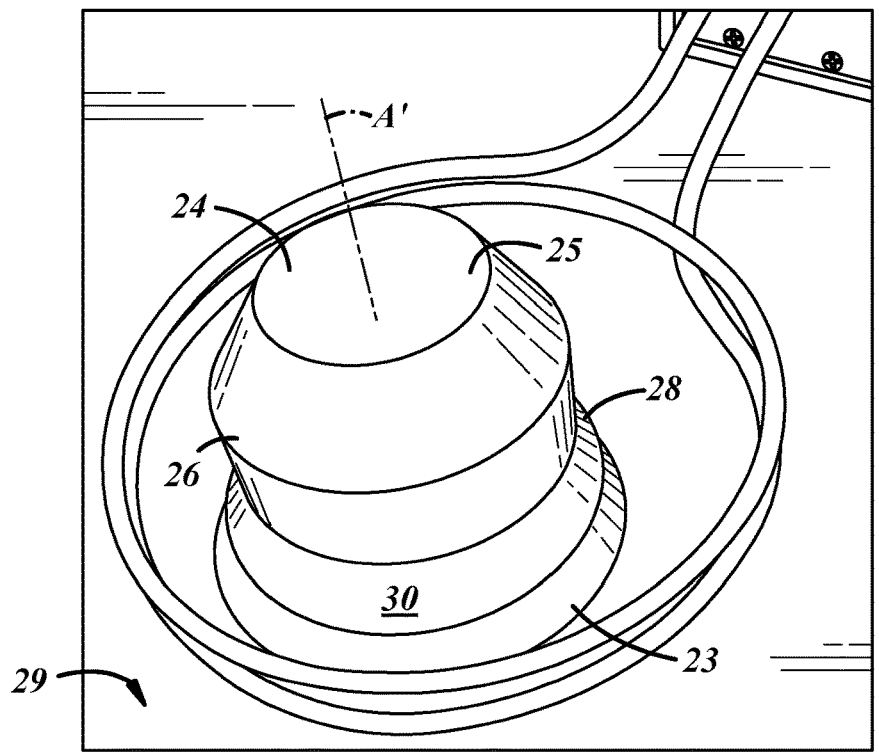
FIG. 5 is an image of a frustoconical male form including a body and an annular susceptor around which the sleeve and skirt components of FIG. 2 are positioned in one embodiment of the presently disclosed indirect induction welding process.

FIG. 1 depicts multiple thermoplastic membrane components that can be joined together to form pipe flashing structures, sometimes referred to as stack flashing, for thermoplastic roofing membranes (not shown), in accordance with one or more embodiments of the present disclosure. The thermoplastic membrane components depicted in FIG. 1 include a flexible cylindrical sleeve 10 having a central longitudinal axis A and a flexible substantially flat skirt 12. The cylindrical sleeve 10 may be manufactured using a hot gas welding process, and RF welding process, or an indirect induction welding technique of the type described herein. The skirt 12 has a circular opening 14 extending through a central region of the skirt 12 and is concentric with the central longitudinal axis A of the sleeve 10. As shown in FIGS. 2-4, the sleeve 10 and the skirt 12 can be used to manufacture a unitary pipe flashing structure 16 by forming a solid weld joint between overlapping portions of the sleeve 10 and the skirt 12. In particular, the sleeve 10 and the skirt 12 can be used to manufacture the pipe flashing structure 16 by forming a solid weld joint 18 between a base portion 20 of the sleeve 10 and an overlapping annular waist portion 22 of the skirt 12 surrounding the opening 14. The sleeve 10 and the skirt 12 both comprise an electrically insulating thermoplastic material, although the thermoplastic material of the sleeve 10 may or may not be the same as that of the skirt 12.

Referring now to FIGS. 5-14, during manufacture of the pipe flashing structure 16, the sleeve 10 and the skirt 12 are positioned over and around a frustoconical male form 24 having a central longitudinal axis A', a base 23, and a top 25 extending from the base 23. The male form 24 includes a body 26 and an annular electrically conductive metal susceptor 28 having an outer circumferential surface 30. The body 26 may be made of an electrically insulating material, such as a non-metal or a natural or synthetic polymeric material, e.g., nylon. In some embodiments, the body 26 may be made of a metallic material having relatively low electrical resistivity (e.g., less than $5 \times 10^{-8}$ Ω·m at 20° C.), such as aluminum (Al), copper (Cu), or brass. The susceptor 28 may comprise an electrically conductive metal or metal alloy having relatively high electrical resistivity (e.g., greater than $5 \times 10^{-7}$ Ω·m at 20° C.), such as stainless steel. In some embodiments, the susceptor 28 may comprise a ferromagnetic or ferrimagnetic material.

Figure 6A:
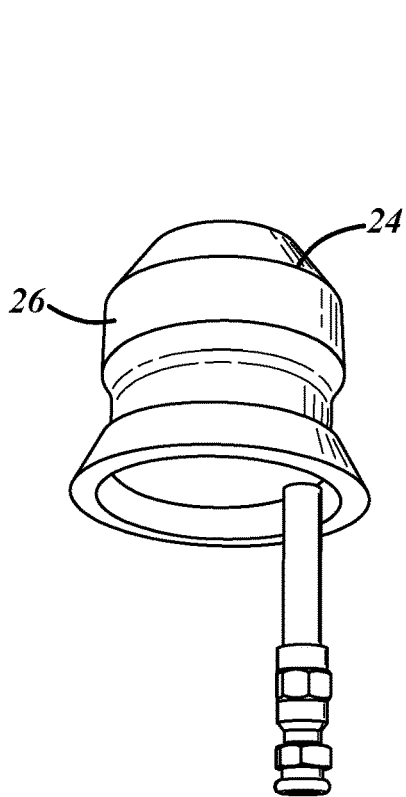
FIGS. 6A and 6B are images of the frustoconical male form of FIG. 5.
Figure 6B:
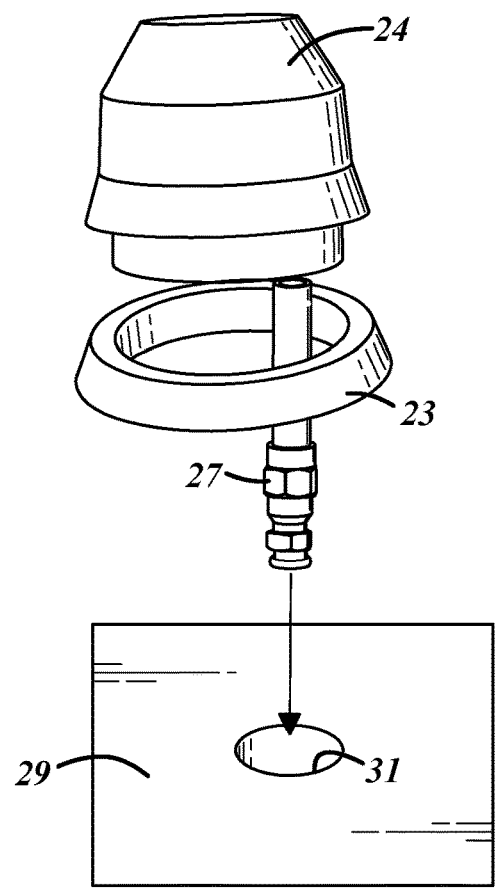
Figure 7:
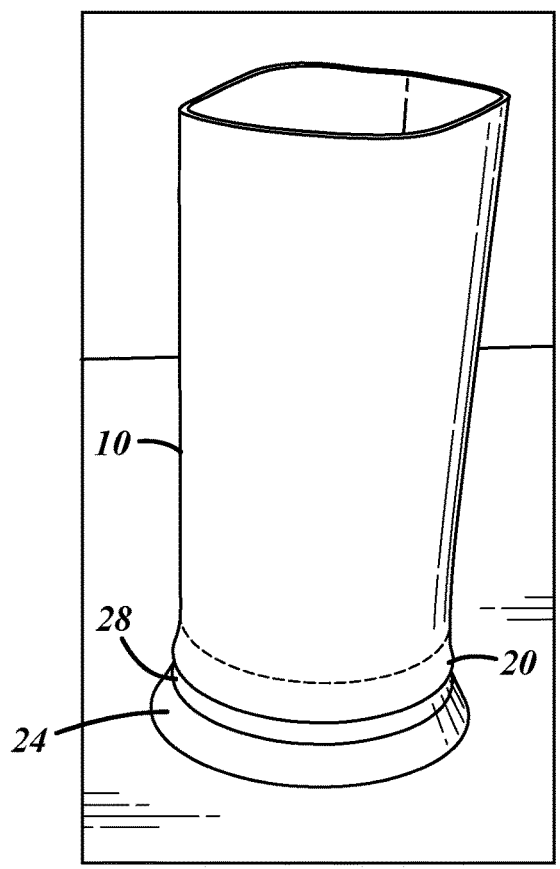
FIG. 7 is an image of the sleeve component of FIG. 2 positioned over and around the male form of FIG. 5.
Figure 8:
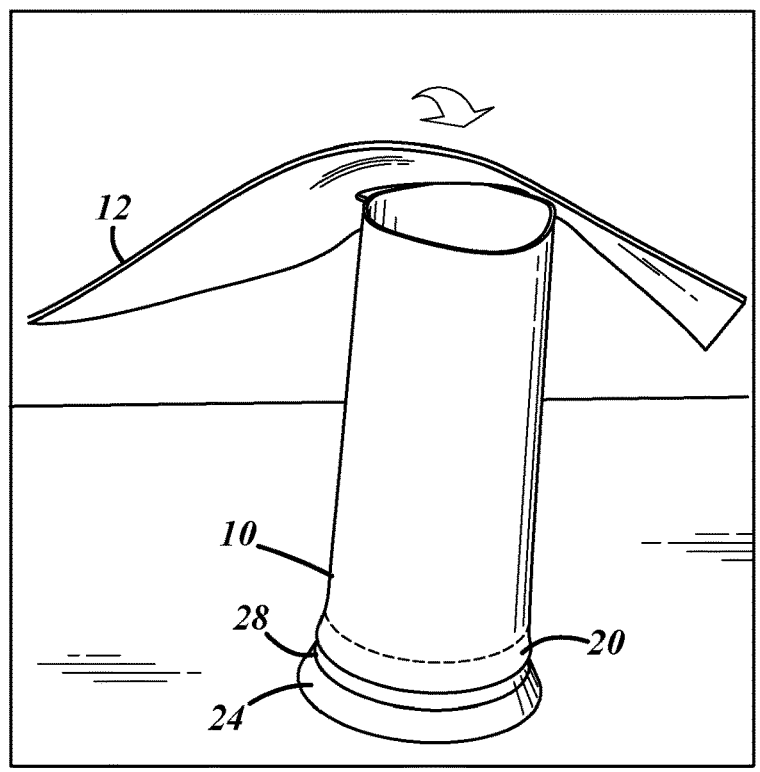
FIG. 8 is an image of the skirt component of FIG. 2 as the skirt component is being positioned over and around the sleeve component and the male form of FIG. 7.
Figure 9:
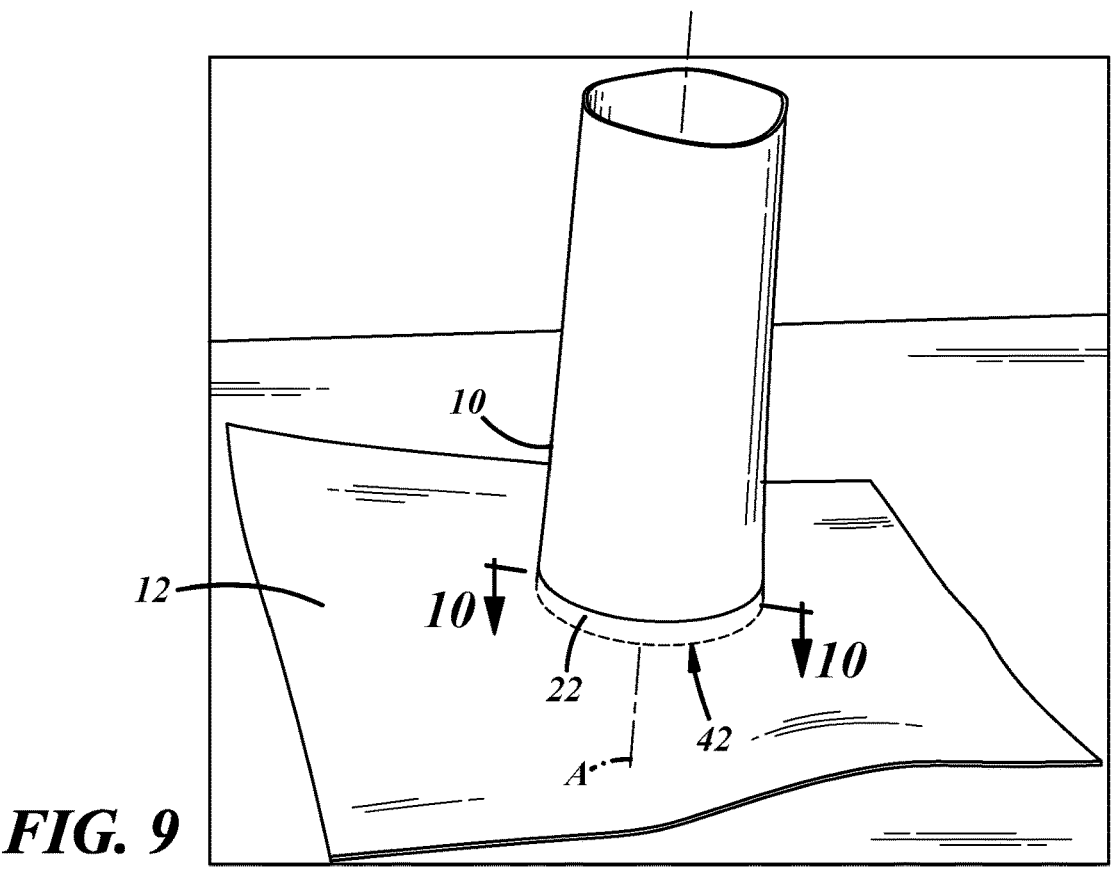
FIG. 9 is an image of the skirt component positioned around the sleeve component and the male form of FIG. 8 such that a portion of the skirt component overlaps a portion of the sleeve component.
Figure 10:
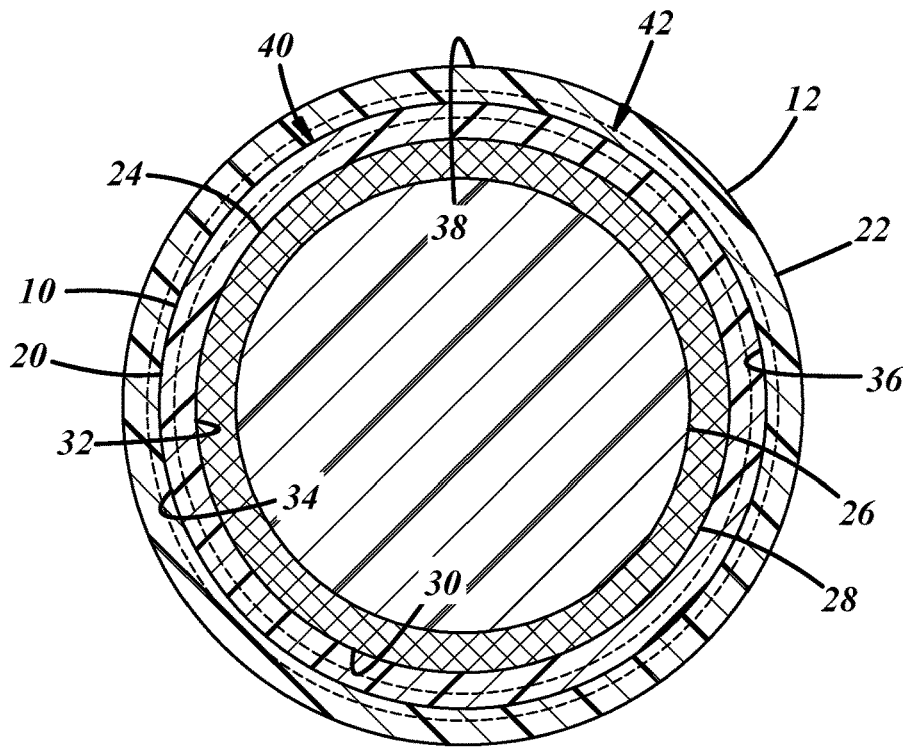
FIG. 10 is a schematic cross-sectional view of the sleeve and skirt components and the male form of FIG. 9 taken along line 10-10.

The base 23 and the top 25 of the male form 24 are defined by the body 26. The susceptor 28 extends circumferentially around the body 26, between the base 23 and top 25 of the male form 24, and is concentric with the central longitudinal axis A' of the male form 24. As shown in FIGS. 6A and 6B, the base 23 of the form 24 may be removable for positioning of the susceptor 28 between the base 23 and top 25 of the male form 24. In some embodiments, a conduit 27 may extend from the base 23 of the male form 24 and may be configured to supply a liquid cooling medium (e.g., water) to an internal cooling passage (like the cooling passage 152 described herein with respect to FIGS. 18 and 19) defined in the body 26 of the male form 24. In practice, the male form 24 may be mounted on a platform 29, which may include a hole 31 configured for receipt of the conduit 27. In the embodiment depicted in FIGS. 5-14, the male form 24 is physically separable from the platform 29; however, in other embodiments, the male form 24 may be integral with the platform 29. For example, in some embodiments, the male form 24 may be of unitary one-piece construction with the platform 29.

The outer circumferential surface 30 of the susceptor 28 may be coated with a thin metallic or non-metallic material layer to prevent the base and/or waist portions 20, 22 of the sleeve 10 and the skirt 12 from sticking or adhering to the susceptor 28 during the welding process. For example, the outer circumferential surface 30 of the susceptor 28 may be coated with a layer of a polymeric material, e.g., TEFLON®, or a ceramic material, e.g., CERAKOTE.

As best shown in FIGS. 7-10, the body 26 of the male form 24 is configured to guide the sleeve 10 and the skirt 12 into position around the susceptor 28 so that the central longitudinal axis A of the sleeve 10 and the opening 14 in the skirt 12 are concentric with the central longitudinal axis A' of the male form 24. More specifically, the body 26 is configured to guide the base portion 20 of the sleeve 10 into position around the susceptor 28 such that an inner circumferential surface 32 (FIG. 10) of the base portion 20 faces towards and is positioned adjacent the outer circumferential surface 30 of the susceptor 28, while an outer circumferential surface 34 of the base portion 20 faces away from the susceptor 28. At the same time, the body 26 is configured to guide the waist portion 22 of the skirt 12 into position around the susceptor 28 such that an inner circumferential surface 36 (FIG. 10) of the waist portion 22 faces towards and is positioned adjacent the outer circumferential surface 30 of the susceptor 28, while an outer circumferential surface 38 of the waist portion 22 faces away from the susceptor 28.

In the embodiment depicted in FIGS. 7-10, the sleeve 10 and the skirt 12 are positioned around the male form 24 such that the inner circumferential surface 32 of the base portion 20 of the sleeve 10 is in direct contact with the outer circumferential surface 30 of the susceptor 28, and the base portion 20 of the sleeve 10 is located radially inward of the waist portion 22 of the skirt 12. In other embodiments (not shown), the sleeve 10 and the skirt 12 may be positioned around the male form 24 such that the inner circumferential surface 34 of the waist portion 22 of the skirt 12 is in direct contact with the outer circumferential surface 30 of the susceptor 28, and the waist portion 22 of the skirt 12 is located radially inward of the base portion of the sleeve 10.

In some embodiments (not shown), neither the sleeve 10 nor the skirt 12 may be in direct contact with the outer circumferential surface 30 of the susceptor 28, but instead may be in indirect contact therewith. For example, in some embodiments, a thermally conductive cover (not shown) may be positioned adjacent and around the outer circumferential surface 30 of the susceptor 28 such that the susceptor 28 is spaced apart from the base portion 20 of the sleeve 10 and the waist portion 22 of the skirt 12. In such case, although the base portion 20 of the sleeve 10 and the waist portion 22 of the skirt 12 are physically spaced apart from the susceptor 28, heat may be effectively and efficiently transferred from the susceptor 28, through the thermally conductive cover, and to the base portion 20 of the sleeve 10 and the waist portion 22 of the skirt 12 via thermal conduction. The thermally conductive cover may be situated between and in direct contact with the outer circumferential surface 30 of the susceptor 28 and in direct contact with either: (i) the inner circumferential surface 32 of the base portion 20 of the sleeve 10 or (ii) the inner circumferential surface 34 of the waist portion 22 of the skirt 12, depending on whether the base portion 20 of the sleeve 10 is located radially inward of the waist portion 22 of the skirt 12, or vice versa. The thermally conductive cover may be configured to modify the shape and/or size of the outer circumferential surface 30 of the susceptor 28 to account for different shapes and sizes of thermoplastic membrane components.

When the base portion 20 of the sleeve 10 and the waist portion 22 of the skirt 12 are positioned adjacent and around the susceptor 28, a faying surface of the sleeve 10 overlaps and contacts a faying surface of the skirt 12 to establish a faying interface 40 therebetween at a weld site 42. In the embodiment depicted in FIGS. 7-10, the outer circumferential surface 34 of the base portion 20 of the sleeve 10 defines a faying surface of the sleeve 10 that overlaps and contacts a faying surface of the skirt 12 defined by the inner circumferential surface 36 of the waist portion 22 of the skirt 12 to established the faying interface 40.

Figure 11:
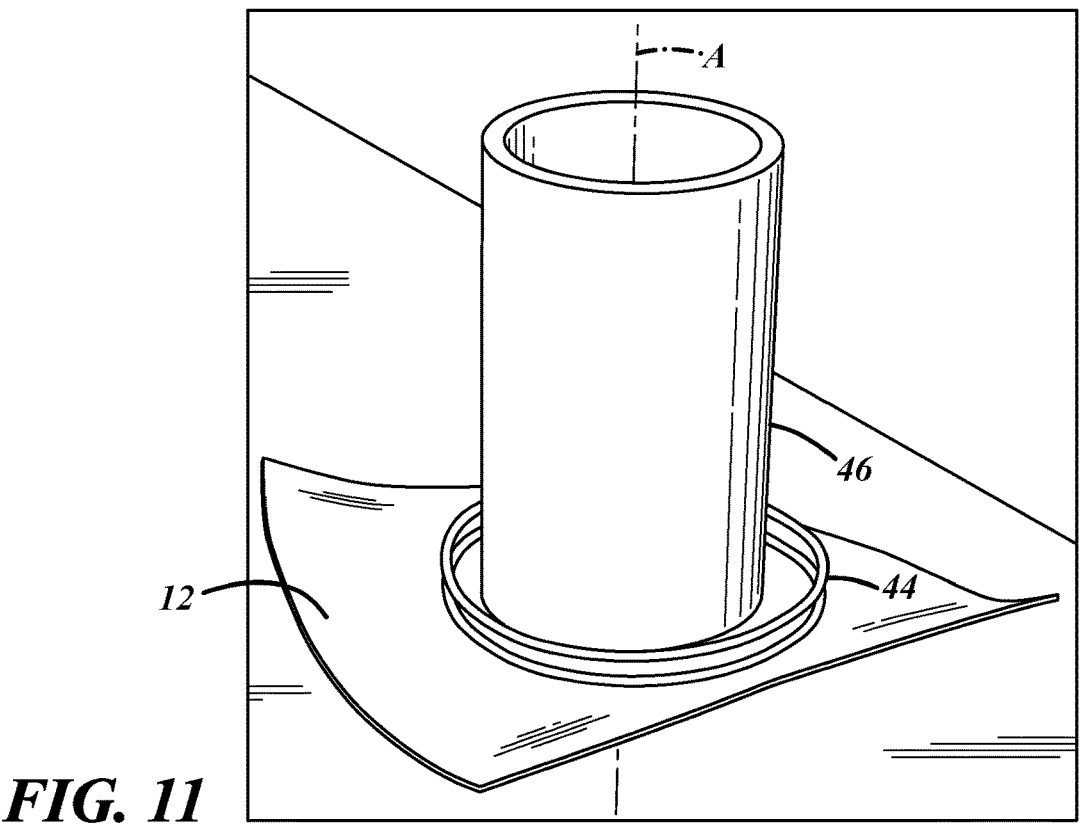
FIG. 11 is an image of the sleeve and skirt components and the male form of FIG. 9 prior to initiating the welding process, wherein a female form and an electrically conductive coil are positioned around the sleeve and skirt components adjacent the overlapping portions thereof.
Figure 12:
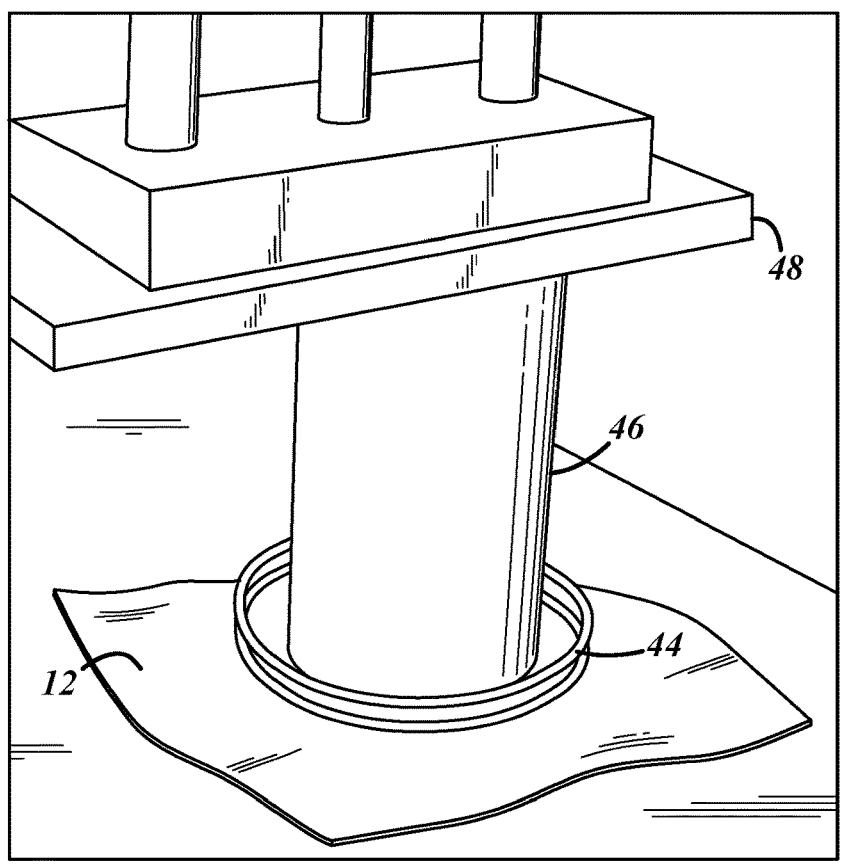
FIG. 12 is an image of a press holding the female form against the overlapping portions of the sleeve and skirt components of FIG. 11.

As shown in FIGS. 11-12, after the base portion 20 of the sleeve 10 and the waist portion 22 of the skirt 12 are positioned around the susceptor 28, an electromagnet in the form of an electrically conductive coil 44 is positioned around the central longitudinal axis A of the sleeve 10 and the skirt 12, adjacent the overlapping base and waist portions 20, 22 thereof. In some embodiments, the coil 44 may be positioned around the central longitudinal axis A of the sleeve 10 and the skirt 12 at a location somewhat above or below the base and waist portions 20, 22 thereof. The coil 44 may be made of metal, e.g., copper.

As shown in FIGS. 11-12, a female form 46 also may be positioned around the central longitudinal axis A of the sleeve 10 and the skirt 12. The female form 46 may be configured to press the base portion 20 of the sleeve 10 and the waist portion 22 of the skirt 12 against one another along the faying interface 40 at the weld site 42. In addition, the female form 46 may be configured to press the overlapping base and waist portions 20, 22 against the outer circumferential surface 30 of the susceptor 28 at the weld site 42. The female form 46 may be made of an electrically insulating material, such as a non-metal or a natural or synthetic polymeric material, e.g., nylon. For example, the female form 46 may be made of a polymeric material having a higher melting point than that of the thermoplastic material of the sleeve 10 and the skirt 12. As shown in FIG. 12, a press 48 may be used to hold the female form 46 against the overlapping portions 20, 22 of the sleeve 10 and the skirt 12 during the welding process. In some embodiments, the press 48 may be hydraulic. In the embodiment depicted in FIGS. 11-12, the coil 44 and the female form 46 are physically separable from the press 48; however, in other embodiments, the coil 44 and/or the female form 46 may be integral with the press 48. For example, in some embodiments, the coil 44 and/or the female form 46 may be of unitary one-piece construction with the press 48.

After the overlapping base and waist portions 20, 22 of the sleeve 10 and the skirt 12 are positioned adjacent and around the susceptor 28 along with the electrically conductive coil 44, heat is generated within the susceptor 28 by passing an alternating current through the coil 44. The alternating current flowing through the coil 44 generates an alternating magnetic field around the coil 44, which produces eddy currents in the susceptor 28. The eddy currents generated in the susceptor 28 locally generate heat within the susceptor 28, which is directly (or indirectly) and rapidly transferred from the susceptor 28 to the surrounding base and waist portions 20, 22 of the sleeve 10 and the skirt 12 by thermal conduction.

Figure 13:
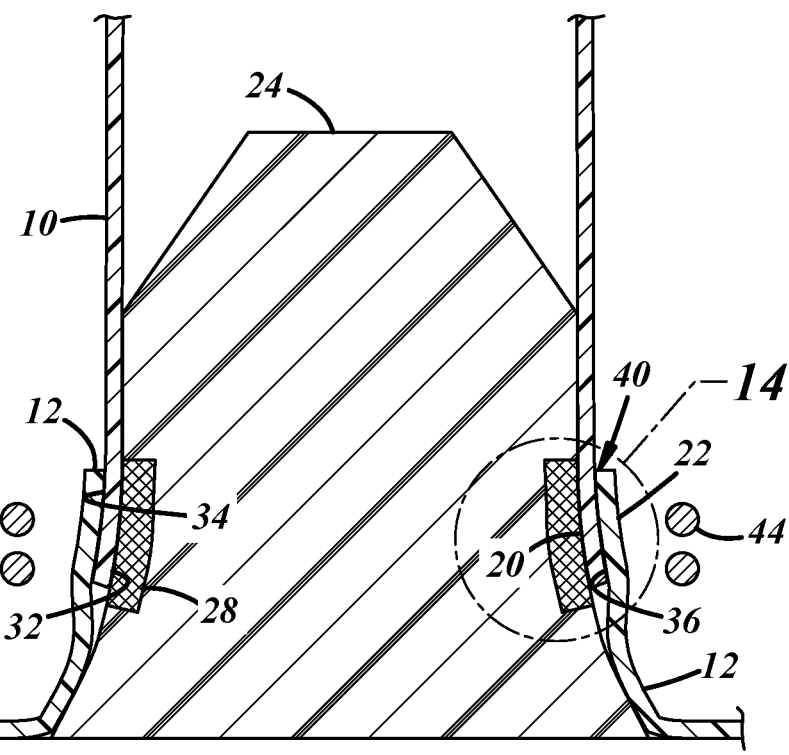
FIG. 13 is a schematic side cross-sectional view of the sleeve and skirt components and the male form of FIG. 9 showing the location of the faying interface established between the overlapping portions of the sleeve and skirt components at the weld site.
Figure 14:
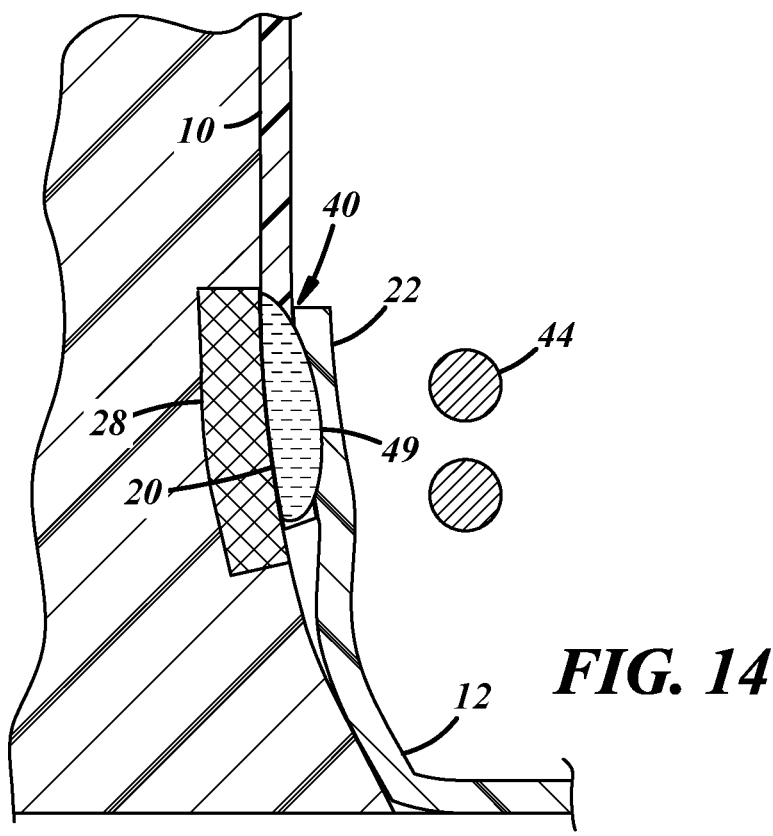
FIG. 14 is an enlarged schematic side cross-sectional view of the sleeve and skirt components and the male form of FIG. 13 depicting the formation of a zone of coalesced thermoplastic material along the faying interface established between the overlapping portions of the sleeve and skirt components during the welding process.

As best shown in FIGS. 13-14, the heat transferred from the susceptor 28 to the base and waist portions 20, 22 causes the overlapping portions 20, 22 to locally melt, coalesce, and form a zone of coalesced thermoplastic material 49 along the faying interface 40 established between the sleeve 10 and the skirt 12. The as-formed zone of coalesced thermoplastic material 49 penetrates at least partway into the base portion 20 of the sleeve 10 and at least partway into the waist portion 22 of the skirt 12 along the faying interface 40. At least a portion of the thermoplastic material of the base portion 20 and at least a portion of the thermoplastic material of the waist portion 22 coalesce to form the zone of coalesced thermoplastic material 49 during the welding process. The zone of coalesced thermoplastic material 49 is formed by heating at least a portion of the thermoplastic material of the base portion 20 and at least a portion of the thermoplastic material of the waist portion 22 along the faying interface 40 to a temperature greater than the glass transition temperature of the thermoplastic material (where the thermoplastic material is amorphous) or to a temperature greater than the melting temperature of the thermoplastic material (where the thermoplastic material is semi-crystalline). For example, the zone of coalesced thermoplastic material 49 is formed by heating portions of the thermoplastic material of the base and waist portions 20, 22 along the faying interface 40 to a temperature greater than 200 degrees Celsius. During the welding process, the frequency of the alternating current applied to the coil 44 may be in the range of 10 Hz to 10 MHz and the alternating current may be passed through the coil 44 for a duration in the range of 15-35 seconds.

Figure 15:
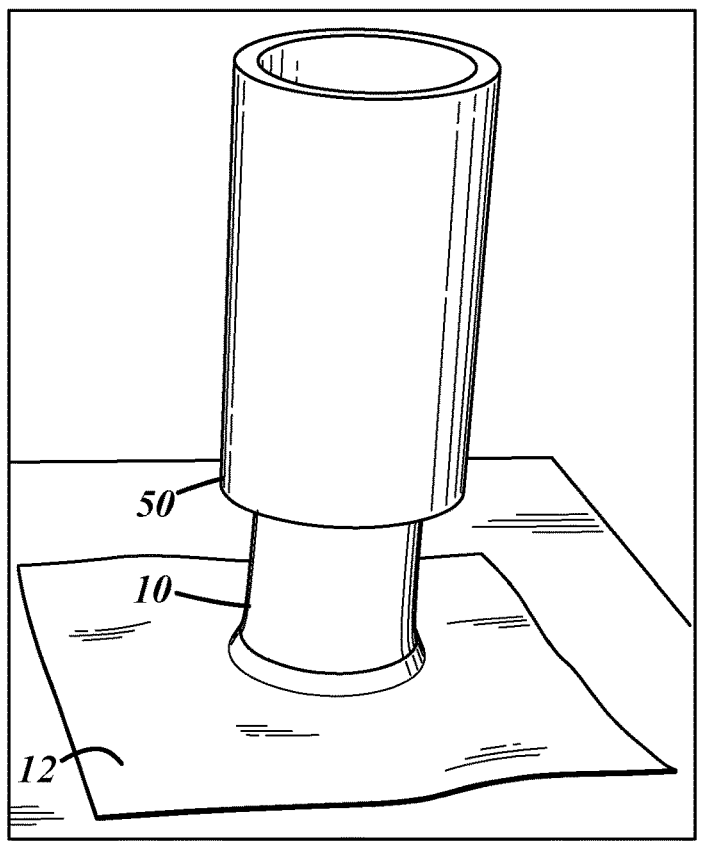
FIG. 15 is an image of the sleeve and skirt components and the male form of FIG. 14 after formation of the liquid pool of thermoplastic material, wherein a cooling member is positioned around the components adjacent the overlapping portions thereof.
Figure 16:
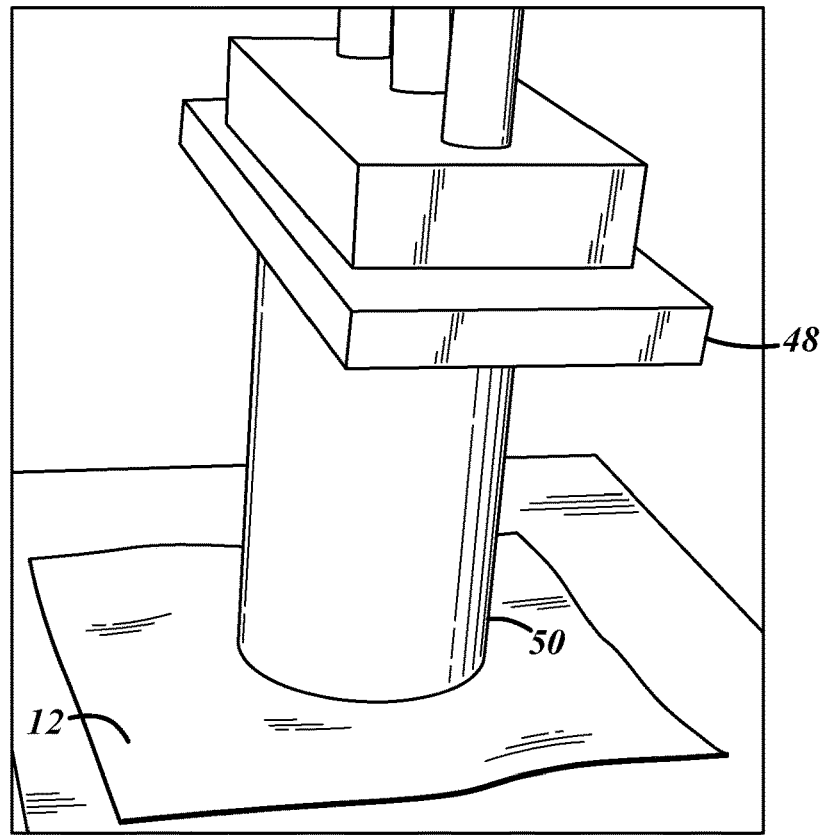
FIG. 16 is an image of a press holding the cooling member against the overlapping portions of the sleeve and skirt components of FIG. 15.

As shown in FIGS. 15-16, after formation of the zone of coalesced thermoplastic material 49, the alternating current is stopped and the zone of coalesced thermoplastic material 49 is cooled to form the solid weld joint 18 of resolidified thermoplastic material that fusion welds the base and waist portions 20, 22 of the sleeve 10 and the skirt 12 together at the weld site 42. The resolidification of the coalesced thermoplastic material of the base and waist portions 20, 22 of the sleeve 10 and the skirt 12 creates a strong water-tight bond therebetween. The zone of coalesced thermoplastic material 49 may be rapidly quenched by use of a cooling medium having a relatively high thermal conductivity, as compared to that of the thermoplastic material of the sleeve 10 and the skirt 12. For example, as shown in FIG. 15, after formation of the zone of coalesced thermoplastic material 49 along the faying interface 40, the female form 46 may be removed and replaced with a cooling member 50. The cooling member 50 may be positioned around the sleeve 10 and the skirt 12 such that an inner circumferential surface of the cooling member 50 presses against the base portion 20 of the sleeve 10 and the waist portion 22 of the skirt 12 along the faying interface 40 to assist in transfer of heat from the base and waist portions 20, 22 to the cooling member 50 via thermal conduction. In some embodiments, the cooling member 50 may be made of a material having high thermal conductivity, e.g., a metal. As shown in FIG. 16, the press 48 may be used to hold the cooling member 50 against the overlapping portions 20, 22 of the sleeve 10 and the skirt 12 during the cooling stage of the welding process. In the embodiment depicted in FIGS. 15-16, the cooling member 50 is physically separable from the press 48; however, in other embodiments, the cooling member 50 may be integral with the press 48. For example, in some embodiments, the cooling member 50 may be of unitary one-piece construction with the press 48.

In some embodiments (not shown), a third thermoplastic component (not shown) comprising a first surface and an opposite second surface may be situated between the base portion 20 of the sleeve 10 and the waist portion 22 of the skirt 12 adjacent and around the susceptor 28. The third thermoplastic component may comprise an electrically insulating thermoplastic material, as described above, which may be nonpolar. The third thermoplastic component may be in direct contact with both the base portion 20 of the sleeve 10 and the waist portion 22 of the skirt 12. The third thermoplastic component may be situated between the base portion 20 of the sleeve 10 and the waist portion 22 of the skirt 12 such that the first surface of the third thermoplastic component faces toward and contacts an opposing surface of the base portion 20 of the sleeve 10 to establish a first faying interface therebetween at a weld site and the second surface of the third thermoplastic component faces toward and contacts an opposing surface of the waist portion 22 of the skirt 12 to establish a second faying interface therebetween at the weld site. In such case, the heat generated in the susceptor 28 by the alternating magnetic field may be transferred by thermal conduction from the susceptor 28 to the base portion 20 of the sleeve 10, the waist portion 22 of the skirt 12, and the third thermoplastic component to locally melt at least a portion of the thermoplastic material of the third thermoplastic component and form a zone of molten thermoplastic material between and along the first and second faying interfaces at the weld site. Thereafter, the zone of molten thermoplastic material may be cooled to form a solid weld joint of resolidified thermoplastic material between the base portion 20 of the sleeve 10, the waist portion 22 of the skirt 12 that bonds the base portion 20 of the sleeve 10, the waist portion 22 of the skirt 12 together at the weld site.

FIGS. 17-19 depict another embodiment of a frustoconical male form 124 that may be used to position overlapping thermoplastic components adjacent and around an annular electrically conductive metal susceptor (not shown). The male form 124 depicted in FIGS. 17-19 has a body 126 that includes an internal cooling passage 152 having an inlet 154 in which a liquid cooling medium is received and an outlet 156 through which the liquid cooling medium is discharged. The cooling medium may be supplied to the inlet 154 and discharged from the outlet 156 of the cooling passage 152 via conduits 158, which may extend from a base 123 of the male form 124 and may be coupled to a liquid cooling medium supply (not shown). The cooling passage 152 may be located within the male form 124 radially inward of and adjacent the susceptor to help transfer heat away from the susceptor and away from the liquid pool of thermoplastic material during the cooling stage of the welding process. In some embodiments, the liquid cooling medium may comprise water.

Figure 20:
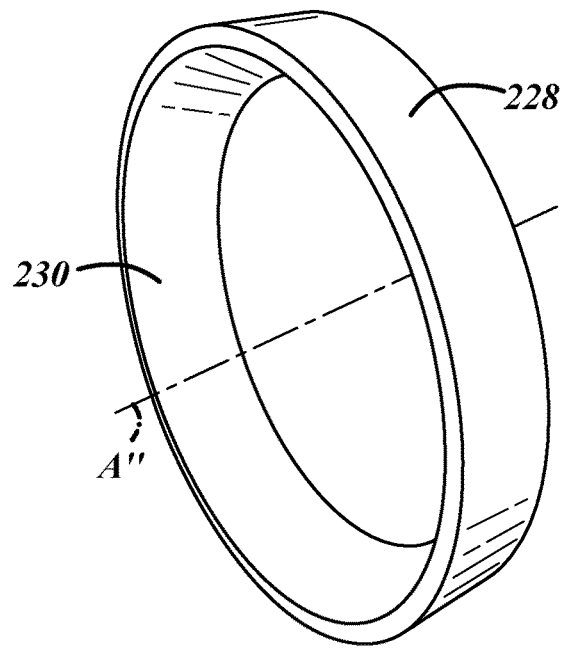
FIGS. 20, 21, and 22 are images of an annular susceptor, a frustoconical male form, and a base including another annular susceptor for use in joining overlapping portions of thermoplastic components together, in accordance with one or more embodiments of the present disclosure.
Figure 21:
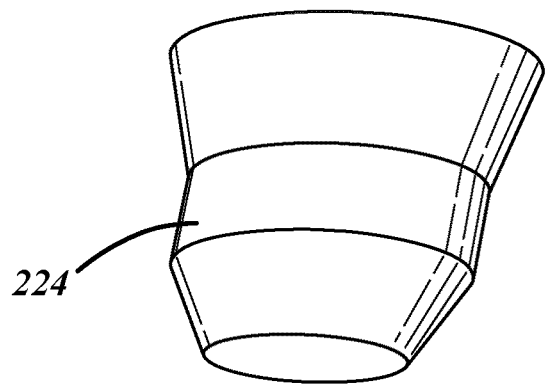

FIGS. 20-21 depict an annular electrically conductive metal susceptor 228 that may be used to generate and supply heat to overlapping portions of thermoplastic membrane components (not shown) to join the overlapping portions together, in accordance with one or more embodiments of the present disclosure. The susceptor 228 includes a central longitudinal axis A″ and an inner circumferential surface 230 configured to contact and transfer heat to the overlapping thermoplastic membrane components during the welding process. The susceptor 228 may be made of the same material as that of the susceptor 28 and also may include a non-stick coating on the inner circumferential surface 230 thereof (like the non-stick coating described herein with respect to FIGS. 5-14).

In some embodiments, the susceptor 228 may be used in combination with the male form 24 or 124 of FIGS. 5-19 and may be placed over and around the overlapping base and waist portions 20, 22 of the sleeve 10 and the skirt 12 prior to welding. In such case, the female form 46 may be omitted and the inner circumferential surface 230 of the susceptor 228 may be used to press the base portion 20 of the sleeve 10 and the waist portion 22 of the skirt 12 against one another along the faying interface 40 and also may press the overlapping base and waist portions 20, 22 against the outer circumferential surface 30 of the susceptor 28. When the susceptor 228 is used in combination with the male form 24 or 124 of FIGS. 5-19, heating will be induced in both of the susceptors 28, 228 by application of the alternating magnetic field and heat will be transferred from both of the susceptors 28, 228 to the base and waist portions 20, 22 of the sleeve 10 and the skirt 12 by thermal conduction to locally melt and coalesce the portions 20, 22 and form the zone of coalesced thermoplastic material 49. In particular, heat will be directly transferred from the outer circumferential surface 30 of the susceptor 28 to the inner circumferential surface 32 of the base portion 20 of the sleeve 10 and heat will be directly transferred from the inner circumferential surface 230 of the susceptor 228 to the outer circumferential surface 38 of the waist portion 22 of the skirt 12.

Figure 22:
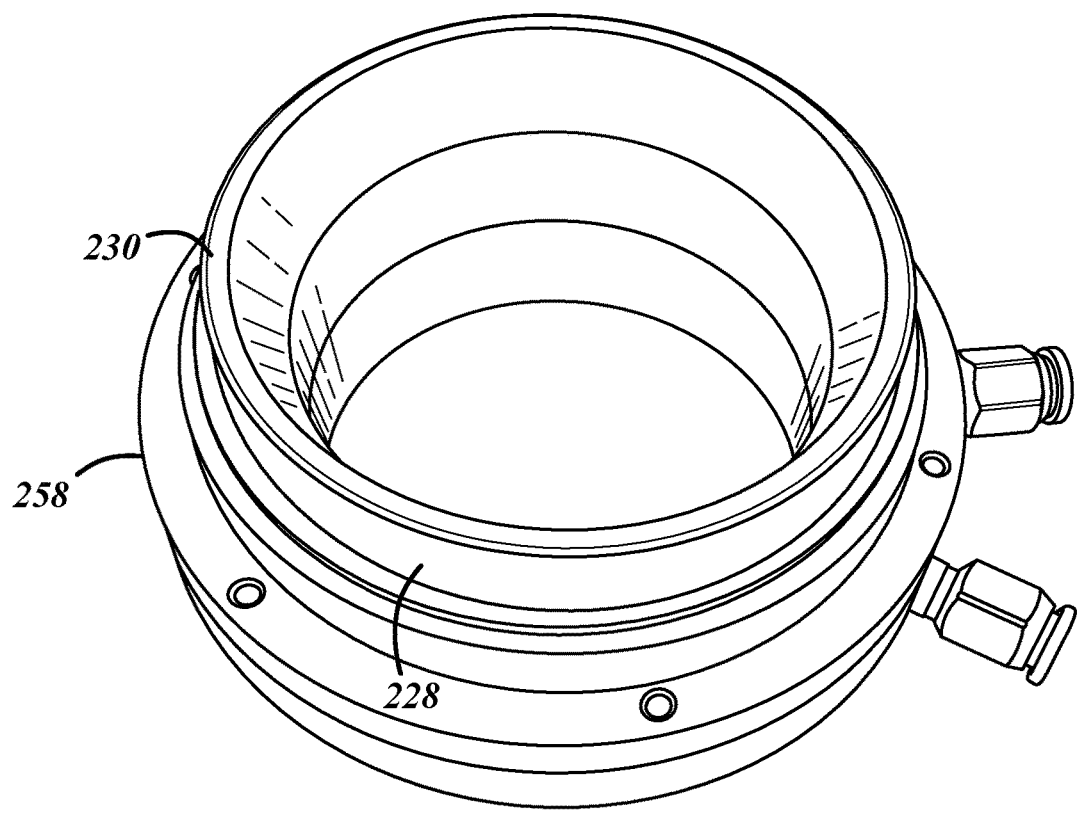

In another form, the susceptor 228 may be used in combination with a male form 224 (FIG. 21) that does not include a susceptor. In such case, the susceptor 228 may be positioned on an annular base 258 (FIG. 22) in coaxial alignment therewith. To begin the welding process, the base portion 20 of the sleeve 10 and the waist portion 22 of the skirt 12 (not shown) may be positioned in overlapping relationship with each other adjacent the inner circumferential surface 230 of the susceptor 228. Then, the male form 224 may be received within the sleeve 10 and through the circular opening 14 of the skirt 12 such that an outer circumferential surface of the male form 224 presses the overlapping base and waist portions 20, 22 against each other and against the inner circumferential surface 230 of the susceptor 228. The electrically conductive coil 44 may be positioned around the susceptor 228 and an alternating current may be passed through the coil 44 to generate an alternating magnetic field around the coil 44 and in the susceptor 228 such that heat is generated within the susceptor 228. As discussed above with respect to FIGS. 11-14, the heat transferred from the susceptor 228 to the base and waist portions 20, 22 may cause the overlapping portions 20, 22 to locally melt, coalesce, and form a zone of coalesced thermoplastic material therebetween that solidifies into a solid weld joint and bonds the sleeve 10 and the skirt 12 together.

Figure 23:
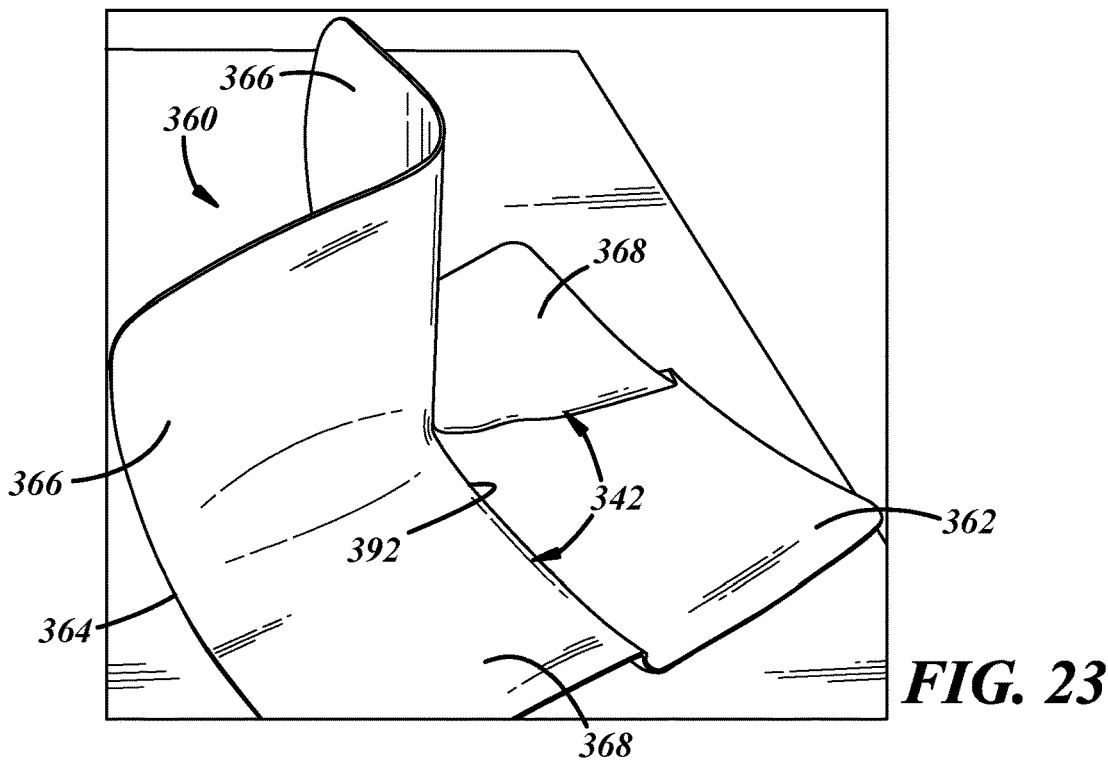
FIG. 23 is an image of a unitary thermoplastic corner piece that can be used to form a curb flashing structure of a thermoplastic roofing membrane, the corner piece including first and second thermoplastic components having overlapping portions that have been joined together at a weld site, in accordance with one or more embodiments of the present disclosure.

FIG. 23 depicts a unitary thermoplastic corner piece 360 that can be used to form a curb flashing structure of a thermoplastic roofing membrane (not shown). The corner piece 360 includes first and second thermoplastic membrane components 362, 364 with overlapping portions that have been joined together at a weld site 342 using an indirect induction welding process, in accordance with one or more embodiments of the present disclosure. In practice, the first component 362 is rectangular in shape and defines a corner base of the corner piece 360 and the second component 364 is rectangular in shape and defines a pair of adjacent corner walls 366 extending to a pair of flaps 368 separated by a slit 392 in the second component 264.

Figure 24:
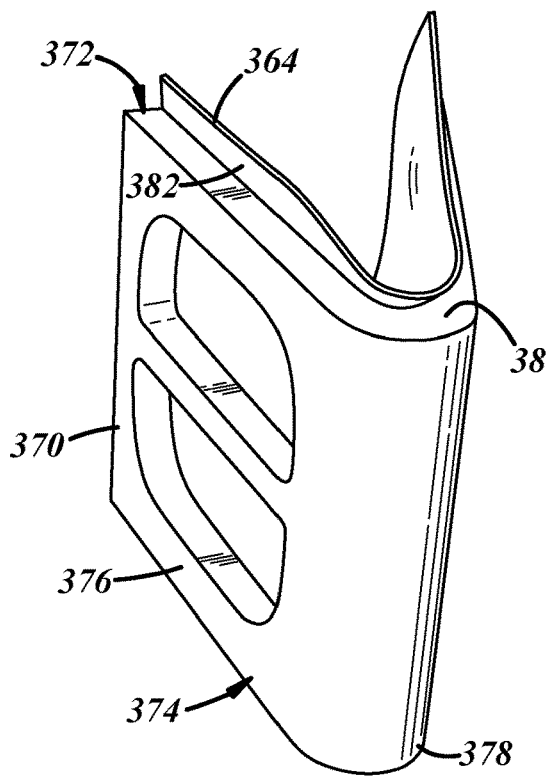
FIGS. 24 and 25 are images of the first thermoplastic component of FIG. 23 positioned within a female form.
Figure 25:
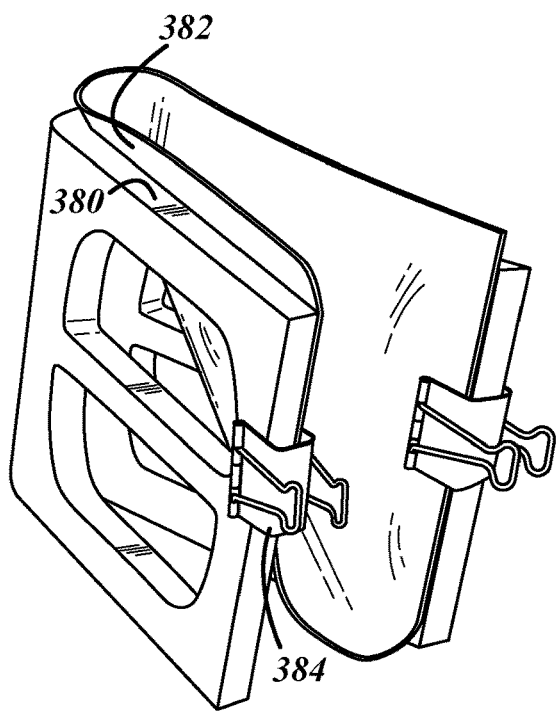

Referring now to FIGS. 24-32, the corner piece 360 may be manufactured by joining overlapping portions of the first and second components 362, 364 together using an indirect induction welding process. In a first stage, a female form 370 having a first end 372 and an opposite second end 374 is provided. The female form 370 may be made of the same material as that of the body 26 of the male form 24. The female form 370 includes a pair of vertical sidewalls 376 joined together by a vertically extending curvilinear section 378. A generally flat V-shaped welding surface 380 is provided at the first end 372 of the female form 370 and is at least partially defined by end portions of the vertical sidewalls 376 and the curvilinear section 378. As shown in FIGS. 24-25, the first component 362 is positioned within the female form 370 between the vertical sidewalls 376 such that a V-shaped outer edge portion 382 of the first component 362 extends above the welding surface 380 defined by the female form 370. As shown in FIG. 25, in some embodiments, the first component 362 may be temporarily coupled to the female form 370 by one or more clips 384.

Figure 26:
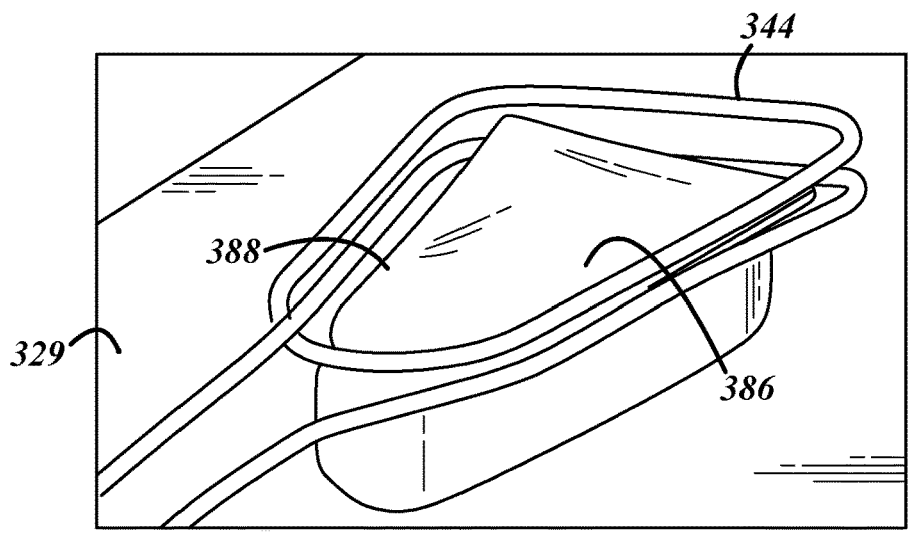
FIG. 26 is an image of a metal substrate having an electrically conductive coil positioned thereacround.
Figure 27:
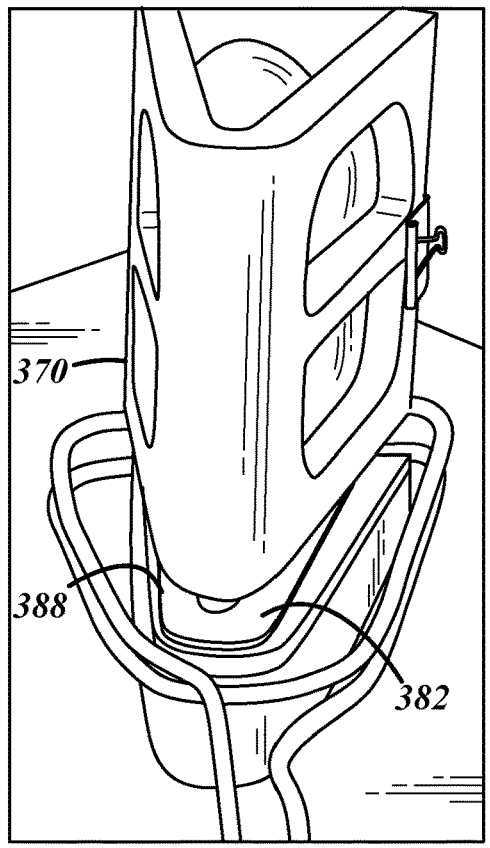
FIG. 27 is an image of the first thermoplastic component and the female form of FIGS. 24 and 25 being positioned on the metal substrate of FIG. 26.
Figure 28:
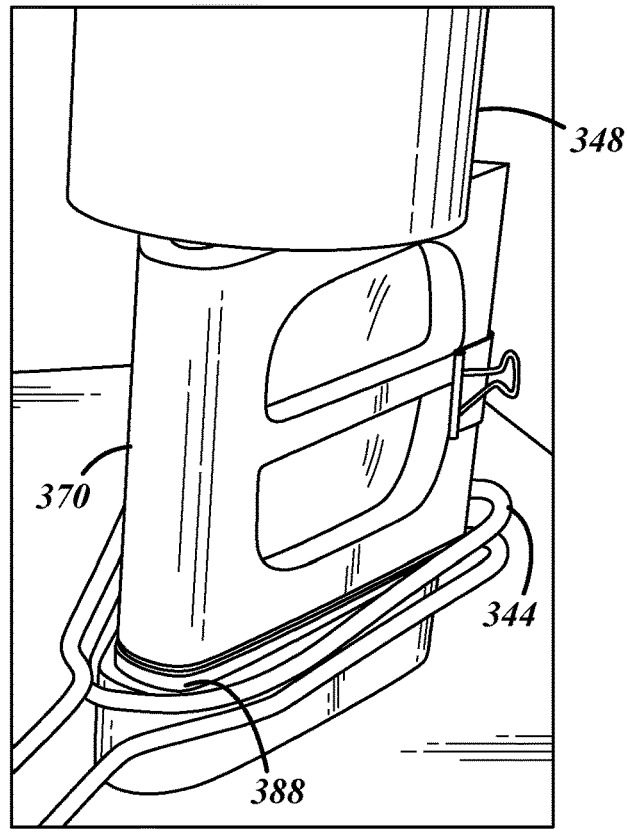
FIG. 28 is an image of a press holding the female form against the first thermoplastic component on the metal substrate of FIG. 27 such that an outer edge portion of the first thermoplastic component is bent outward away from a remaining portion of the first thermoplastic component.

As shown in FIGS. 26-28, in some embodiments, after the first component 362 is positioned within the female form 370, the outer edge portion 382 of the first component 362 may be bent outward away from a remaining portion of the first component 362 by heating the outer edge portion 382 and pressing the edge portion 382 between the welding surface 380 of the female form 370 and an opposing surface 386 of a generally flat metal substrate 388. The metal substrate 388 may be made of the same material as that of the susceptor 28 and also may include a non-stick coating on the opposing surface 386 thereof (like the non-stick coating described herein with respect to FIGS. 5-14). The outer edge portion 382 of the first component 362 may be heated after the edge portion 382 is sandwiched between the welding surface 380 of the female form 370 and the opposing surface 386 of the metal substrate 388 by positioning an electrically conductive coil 344 around the metal substrate 388 and passing an alternating current through the coil 344. The heat generated within the metal substrate 388 is rapidly transferred from the metal substrate 388 to the outer edge portion 382 by thermal conduction. As shown in FIG. 28, in some embodiments, a press 348 may be used to press and hold the welding surface 380 of the female form 370 against the outer edge portion 382 of the first component 362 and to press and hold the outer edge portion 382 of the first component 362 against the surface 386 of the metal substrate 388 during the heating process. In the embodiments depicted in FIGS. 26-31, the coil 344 and the metal substrate 388 are physically separable from the platform 329; however, in other embodiments, the coil 344 and/or the metal substrate 388 may be integral with the platform 329 and/or with one another. For example, in some embodiments, the coil 344 and/or the metal substrate 388 may be of unitary one-piece construction with the platform 329 and/or with one another.

Figure 29:
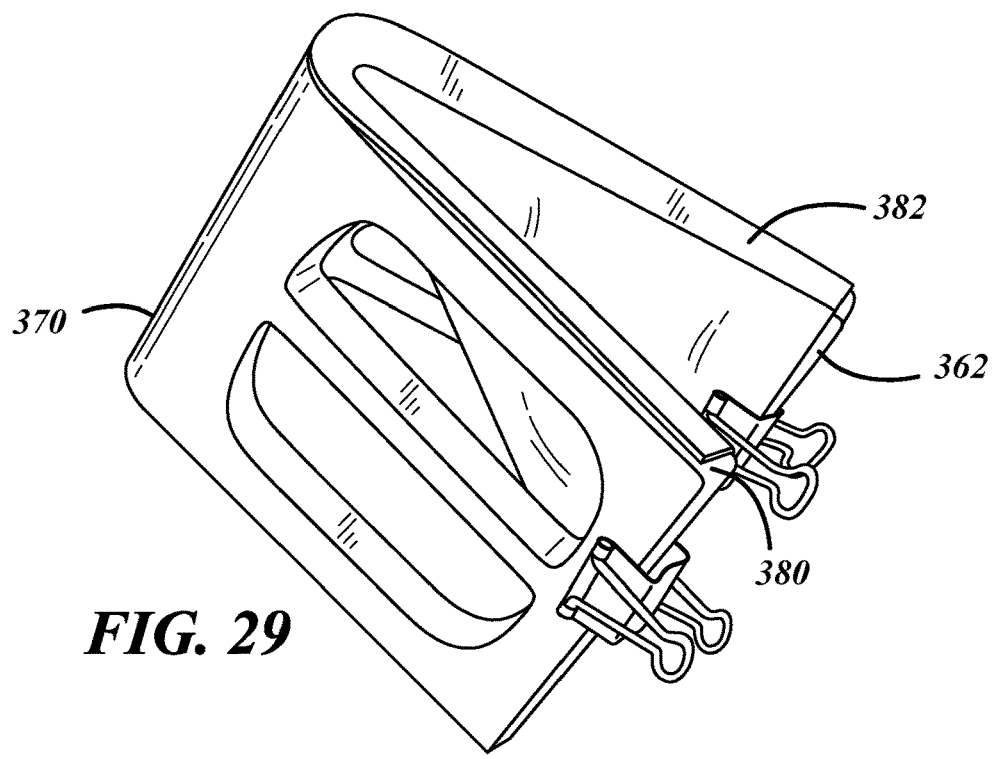
FIG. 29 is an image of the first thermoplastic component positioned within the female form of FIG. 28 after the outer edge portion of the first thermoplastic component has been molded in the bent position by application of heat from the metal substrate.
Figure 30:
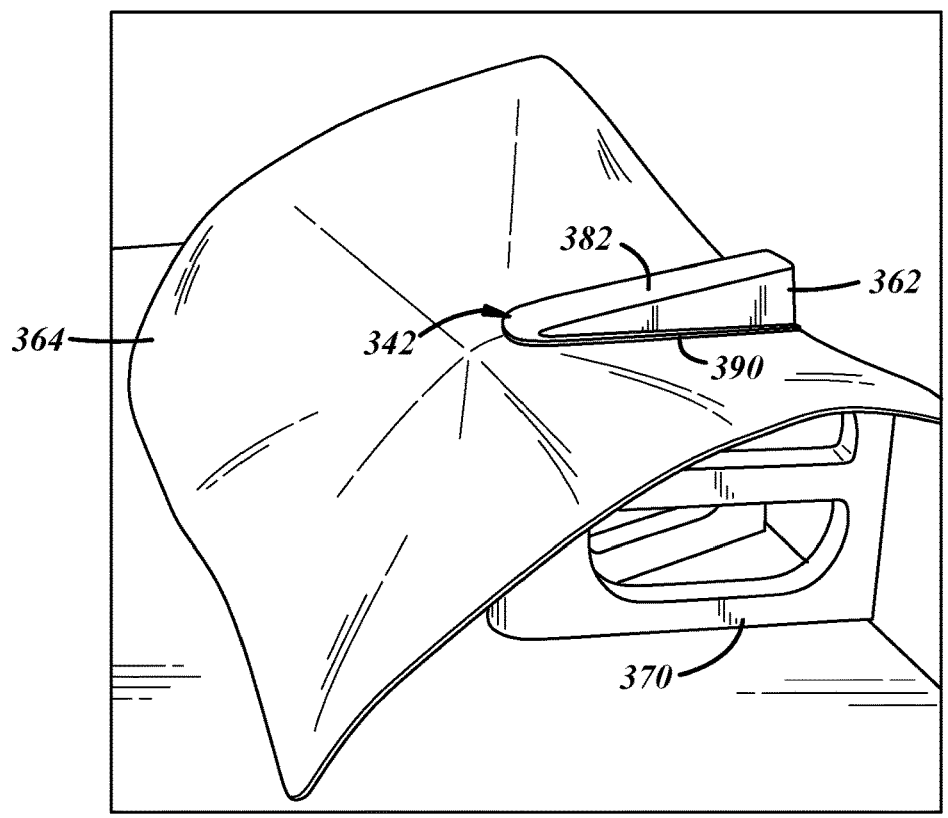
FIG. 30 is an image of the first thermoplastic component positioned within the female form of FIG. 29 and the second thermoplastic component of FIG. 23 as the second thermoplastic component is being positioned around the first component such that an inner edge portion of the second component overlaps the outer edge portion of the first component.

As shown in FIGS. 29-30, after the outer edge portion 382 of the first component 362 is bent outward away from the remaining portion of the first component 362, in a second stage, the first and second components 362, 364 are positioned in overlapping relationship with one another. In particular, an inner edge portion 390 of the second component 364 defined by the slit 392 (FIG. 23) in the second component 364 is positioned in overlapping relationship with the outer edge portion 382 of the first component 362. As best shown in FIG. 30, in some embodiments, while the first component 362 is held within the female form 370, the second component 364 may be slid or otherwise positioned around the first component 362 so that the inner edge portion 390 of the second component 364 is located adjacent and sandwiched between the outer edge portion 382 of the first component 362 and the welding surface 380 defined by the female form 370.

Figure 31:
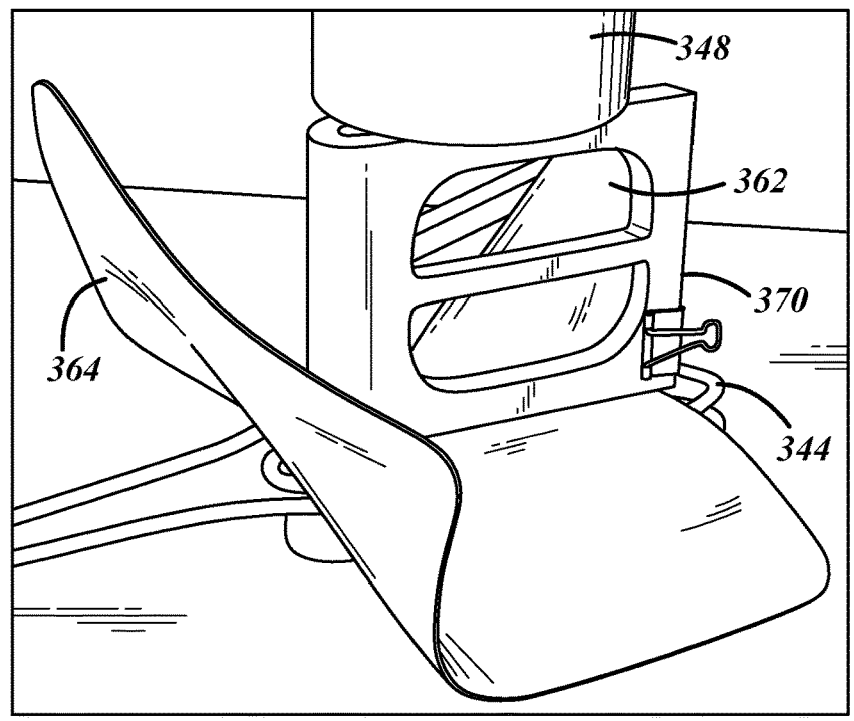
FIG. 31 is an image of the first and second thermoplastic components and the female form of FIG. 30 positioned on the metal substrate of FIG. 26 such that the overlapping edge portions of the first and second thermoplastic components are sandwiched between the female form and the metal substrate during the welding process.
Figure 32:
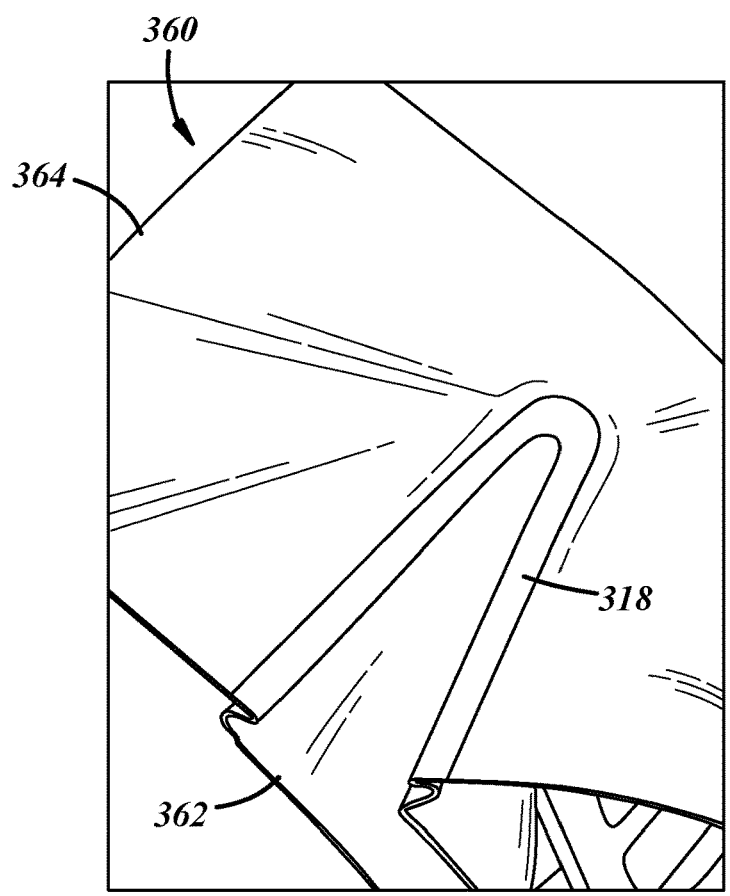
FIG. 32 is an image of a unitary thermoplastic corner piece formed by joining together the overlapping edge portions of the first and second thermoplastic components of FIG. 31 by application of heat from the metal substrate.

As shown in FIG. 31, after the inner edge portion 390 of the second component 364 is positioned in overlapping relationship with the outer edge portion 382 of the first component 362, the first and second components 362, 364 are positioned on the metal substrate 388 and the electrically conductive coil 344 is positioned around the substrate 388. The components 362, 364 are positioned on the substrate 388 so that the inner edge portion 390 of the second component 364 and the outer edge portion 382 of the first component 362 are sandwiched between the welding surface 380 of the female form 370 and the opposing surface 386 of the metal substrate 388. The press 348 may be used to press and hold the welding surface 380 of the female form 370 against the inner edge portion 390 of the second component 364 and to press and hold the edge portions 382, 390 of the first and second components 362, 364 against the surface 386 of the metal substrate 388. In this position, the outer edge portion 382 of the first component 362 defines a faying surface of the first component 362 that overlaps and contacts a faying surface of the second component 364 defined by the inner edge portion 390 of the second component 364 to establish a faying interface (not shown) at the weld site 342.

After the edge portions 382, 390 of the first and second components 362, 364 are positioned in overlapping relationship against the surface 386 of the metal substrate 388 and the electrically conductive coil 344 is positioned around the metal substrate 388, heat is applied to the edge portions 382, 390 by passing an alternating current through the coil 344 so that heat is generated within the metal substrate 388 and transferred to the edge portions 382, 390 by thermal conduction. Heat is applied to the edge portions 382, 390 of the first and second components 362, 364 so that the edge portions 382, 390 at least partially melt, coalesce, and fuse together along the faying interface at the weld site 342. Thereafter, the edge portions 382, 390 are cooled and resolidify, thereby forming a solid weld joint 318 that fuses the edge portions 382, 390 of the first and second components 362, 364 together at the weld site 342. The edge portions 382, 390 may be rapidly quenched by use of a cooling medium having a relatively high thermal conductivity, as compared to that of the thermoplastic material of the first and second components 362, 364. In some embodiments, the cooling medium may comprise a cooling liquid (e.g., water), which may be passed through an internal cooling passage (not shown) in the female form 370 and/or in the metal substrate 388. Additionally or alternatively, the cooling medium may comprise a solid cooling member (not shown), which may be positioned adjacent the edge portions 382, 390 of the first and second components 362, 364.

In the embodiments depicted in FIGS. 28 and 31, the press 348 is physically separable from the female form 370; however, in other embodiments, the female form 370 may be integral with the press 348. For example, in some embodiments, the female form 370 may be of unitary one-piece construction with the press 348.

It is to be understood that the foregoing is a description of one or more preferred exemplary embodiments of the invention. The invention is not limited to the particular embodiment(s) disclosed herein. Various other embodiments and various changes and modifications to the disclosed embodiment(s) will become apparent to those skilled in the art.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An apparatus for joining overlapping thermoplastic membrane components using an indirect induction welding technique, the apparatus comprising:
   first and second forms having complementary molding surfaces configured to receive overlapping thermoplastic membranes therebetween, wherein the first form comprises a male form including a body having an annular electrically conductive metal susceptor extending around the body of the male form, and the second form comprising a cylindrical female form, the second form configured to be disposed about at least a portion of the first form; and
   an electrically conductive coil positioned about the second female form and adjacent the metal susceptor.

2. The apparatus set forth in claim 1 wherein the male form defines a first hole configured to receive a conduit and a second hole configured to receive a conduit, wherein the first and second holes are connected by an internal cooling passage configured to receive a cooling medium.

3. The apparatus as set forth in claim 1 wherein the complementary molding surface of the first form is defined by the metal susceptor.

4. The apparatus as set forth in claim 3 wherein the body of the first form comprises an electrically insulating material.

5. The apparatus as set forth in claim 4 wherein the second form comprises an electrically insulating material.

6. The apparatus as set forth in claim 3 wherein the metal susceptor comprises a non-stick surface.

* * * * *